US012658712B2

(12) United States Patent
Allo

(10) Patent No.: US 12,658,712 B2
(45) Date of Patent: Jun. 16, 2026

(54) AUTONOMOUS POWER GENERATION SYSTEM

(71) Applicant: ElektrikGreen, Inc., Lyons, CO (US)

(72) Inventor: Christopher N. Allo, Lyons, CO (US)

(73) Assignee: ElektrikGreen, Inc., Lyons, CO (US)

( * ) Notice: Subject to any disclaimer, the term of this patent is extended or adjusted under 35 U.S.C. 154(b) by 692 days.

(21) Appl. No.: 18/095,135

(22) Filed: Jan. 10, 2023

(65) Prior Publication Data

US 2023/0163601 A1 May 25, 2023

Related U.S. Application Data

(63) Continuation-in-part of application No. 16/948,950, filed on Oct. 7, 2020, now Pat. No. 11,552,317.

(60) Provisional application No. 62/911,434, filed on Oct. 7, 2019.

(51) Int. Cl.
| | |
|---|---|
| *H02J 3/40* | (2026.01) |
| *H02J 3/38* | (2006.01) |
| *H02J 101/24* | (2026.01) |

(52) U.S. Cl.
CPC ................ *H02J 3/40* (2013.01); *H02J 3/381* (2013.01); *H02J 2101/24* (2026.01)

(58) Field of Classification Search
CPC ........................................................ H02J 3/40
See application file for complete search history.

(56) References Cited

U.S. PATENT DOCUMENTS

| | | | |
|---|---|---|---|
| 7,279,245 | B1 | 10/2007 | Clark |
| 8,435,684 | B2 | 5/2013 | Kani et al. |
| 8,685,223 | B2 | 4/2014 | Kurashina et al. |
| 9,391,457 | B2 | 7/2016 | Frolov et al. |
| 9,489,701 | B2 | 11/2016 | Emadi et al. |
| 9,711,967 | B1 * | 7/2017 | Czarnecki ............... H02J 3/381 |

(Continued)

FOREIGN PATENT DOCUMENTS

| | | |
|---|---|---|
| JP | 4023731 B2 | 4/2004 |
| JP | 2006008459 A | 1/2006 |
| WO | 2009063104 A1 | 5/2009 |

OTHER PUBLICATIONS

Pascuzzi, S., et al.; "Electrolyzer Performance Analysis of an Integrated Hydrogen Power System for Greenhouse Heating. A Case Study"; Sustainability 8:629 (2016) 15 pages.

(Continued)

*Primary Examiner* — Daniel Kessie

(74) *Attorney, Agent, or Firm* — Hall Estill Law Firm

(57) ABSTRACT

Method and apparatus for generating green electrical power. A modified grid-tie configuration is provided in which electrical power is supplied to a load from a utility grid source and a photovoltaic (PV) source (e.g. solar panels). A grid-tie inverter generates alternating current (AC) power from the PV source that is phase aligned with AC power from the grid. In the event of a grid outage, a specially configured transfer switch disconnects the grid from the PV source and connects the PV source to a backup source. The grid-tie inverter again matches the AC power from the PV source with AC power from the backup source to enable continued operation of the PV source during the grid outage. The backup source may utilize an electrolyzer that generates stored hydrogen and a hydrogen fuel cell that converts the stored hydrogen to electricity.

20 Claims, 16 Drawing Sheets

(56) References Cited

U.S. PATENT DOCUMENTS

| | | | |
|---|---|---|---|
| 9,755,430 | B2 | 9/2017 | Paquin et al. |
| 9,819,190 | B2 | 11/2017 | Somani et al. |
| 10,090,777 | B2 | 10/2018 | Dent |
| 10,998,730 | B1 * | 5/2021 | Willson ................. H02J 3/381 |
| 11,183,843 | B1 * | 11/2021 | Cooper ................. H02J 3/0075 |
| 2002/0018922 | A1 | 2/2002 | Fuglevand |
| 2004/0126641 | A1 | 7/2004 | Pearson et al. |
| 2005/0109394 | A1 | 5/2005 | Anderson |
| 2006/0068246 | A1 | 3/2006 | Matsuo |
| 2007/0082239 | A1 | 4/2007 | Shiroma |
| 2009/0027932 | A1 * | 1/2009 | Haines .................... H02J 9/062 |
| | | | 363/95 |
| 2009/0189445 | A1 | 7/2009 | Strizki |
| 2014/0034187 | A1 | 2/2014 | Farchmin et al. |
| 2024/0047991 | A1 * | 2/2024 | Caamano ................ H02J 7/007 |

OTHER PUBLICATIONS

Elsmart Corporation; "Data Sheet for 4PRO ATS-xxxA-IRC Automatic Transfer Switches"; printed from website https://www.ats4pro.com/collections/ats-controllers-1/products/4pro-ats-125a-4p-i-automatic-transfer-changeover-switch-125a-230-400v-50hz; 8 pages.

* cited by examiner

GRID-TIED ONLY

HYDROGEN PRODUCTION

ELECTRIC VEHICLE CHARGING

GRID-TIE INVERTER

PV SOURCE — DC → DC-AC RECTIFIER — AC → JCN ↔ AC GRID VOLTAGE

CONTROL

SENSE

NORMAL MODE

UTILITY SERVICE

GRID TERMINAL

CONTROLLER

TRANSFER SWITCH

SENSE INPUT

SOL

240 VAC

PASS-THRU INVERTER

PV SOURCE

500 VDC

GRID-TIE INVERTER

240 VAC

HOUSE LOAD

240 VAC

H2 STORAGE AND FUEL CELL SYSTEM

BATTERIES

OFF-GRID MODE (GRID OUT, SOLAR OPERATION)

AUTONOMOUS POWER GENERATION SYSTEM

RELATED APPLICATIONS

The present application is a continuation-in-part (CIP) of copending parent U.S. patent application Ser. No. 16/948, 950 filed Oct. 7, 2020 and now issued as U.S. Pat. No. 11,552,317 on Jan. 10, 2023, which in turn made a claim of domestic priority to U.S. Provisional Patent Application No. 62/911,434 filed Oct. 7, 2019. The contents of both of these cases are hereby incorporated by reference.

BACKGROUND

Sustainable energy (also sometimes referred to as renewable energy or green energy) generally refers to efforts to generate and utilize energy in an efficient manner such that present needs can be met without adversely affecting future generations. A variety of sustainable energy solutions have been proposed and implemented, such as through the harnessing of solar, wind, geothermal, tidal and other forms of available energy. In one definition, "green energy" can be viewed as energy that is produced cleanly with no carbon footprint during operation. The term "grey energy" is sometimes applied to solutions that utilize some amount of input energy from a non-green source, but is otherwise "green" in subsequent processes or in at least some modes of operation.

While a number of green energy solutions have been proposed, these and other solutions have not been widely adopted from a generation or storage perspective. One limitation is the inability to effectively store energy that is produced at one time (such as during a sunny or windy day) for use during another time (such as at night, during a cloudy or windless day, etc.).

Batteries have been proposed as a mechanism to chemically store energy for future use. However, large capacity batteries are expensive to manufacture, often utilize rare earth and toxic materials that make recycling/disposal environmentally undesirable, and as (as of now) do not provide an acceptable operational life. For example, some forms of modern high capacity batteries can lose as much as 70% of their charge carrying capability in just 2-3 years, and may not last much longer than 8-10 years even with degraded levels of performance. Batteries are also subject to other dangers as well, such as fire, the generation of noxious fumes, etc.

Other forms of energy storage have been proposed and utilized in the art, and these have likewise been met with various limitations. Examples include compressed air (e.g., store energy in the form of compressed air that is then released to spin a turbine), water movement (e.g. pump water to a higher elevation and then release the water to allow gravity to move the water against a turbine), etc.

Accordingly, various embodiments of the present disclosure are generally directed to improvements in the self-generation and storage of electrical power that overcome these and other limitations of the existing art.

SUMMARY

Various embodiments of the present disclosure are generally directed to an apparatus and method for the generation, storage and use of energy in an efficient and environmentally responsible manner.

In some embodiments, a modified grid-tie configuration is provided in which electrical power is supplied to a load from a utility grid source and a photovoltaic (PV) source (e.g. solar panels). A grid-tie inverter generates alternating current (AC) power from the PV source that is phase aligned with AC power from the grid. In the event of a grid outage, a specially configured transfer switch disconnects the grid from the PV source and connects the PV source to a backup source. The grid-tie inverter again matches the AC power from the PV source with AC power from the backup source to enable continued operation of the PV source during the grid outage. The backup source may utilize an electrolyzer that generates stored hydrogen and a hydrogen fuel cell that converts the stored hydrogen to electricity.

These and other features and advantages of various embodiments can be understood from a review of the following detailed description in conjunction with a review of the accompanying drawings.

DETAILED DESCRIPTION

Figure 1:
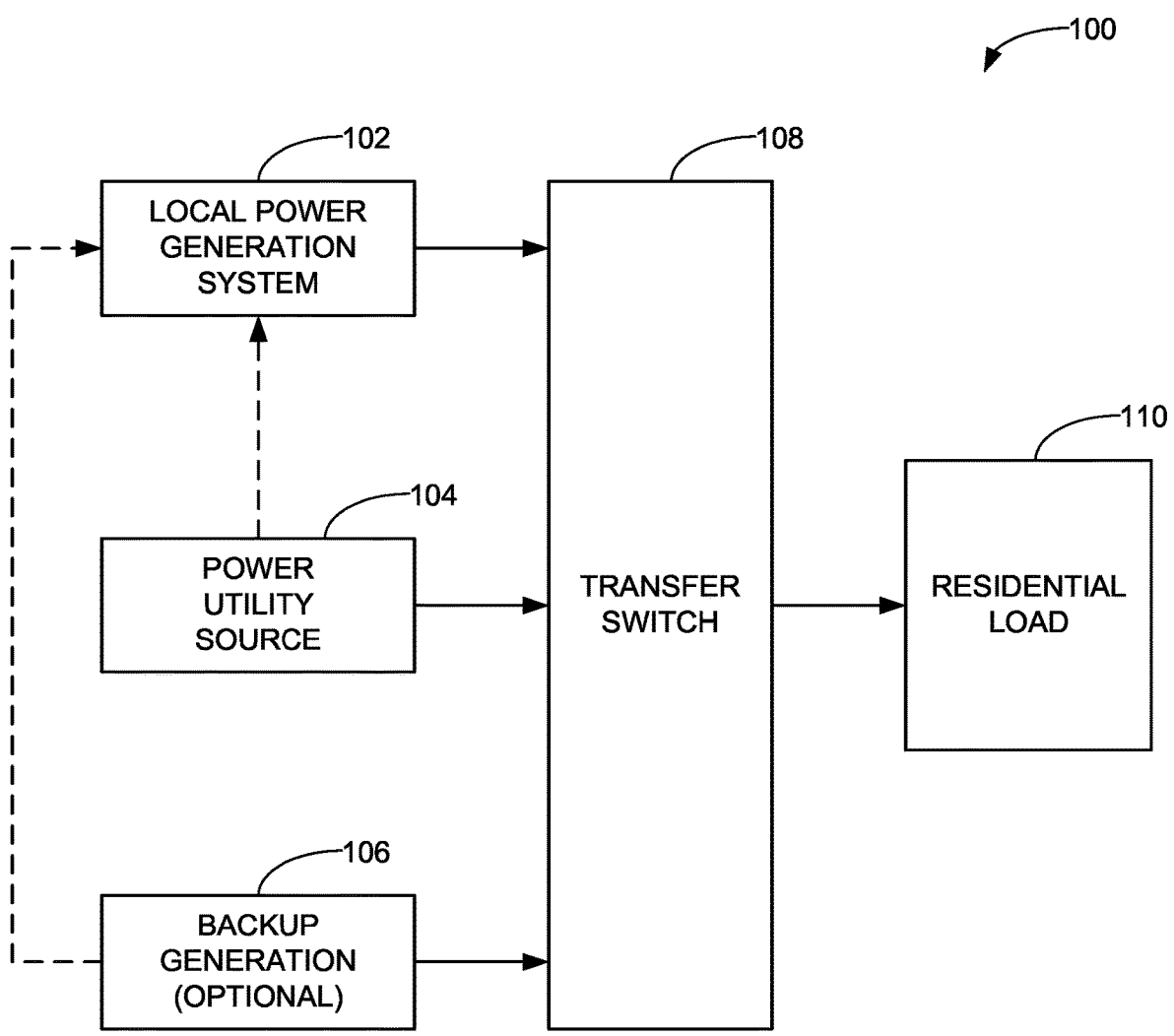
FIG. 1 provides a functional block representation of an electrical power generation system constructed and operated in accordance with various embodiments of the present disclosure.

The present disclosure generally relates to systems and methods for generating, storing and using electrical power in a sustainable manner that conforms with green energy standards and capabilities.

As explained below, a local power generation system and method of operation of the same is provided. While not limiting, the system is intended to provide a user with sufficient electrical power to meet current and future needs in a sustainable fashion without direct reliance upon a public utility or other external source of power (e.g., an "off-grid" approach). The system is modular, scalable, and does not necessarily rely upon batteries or other existing technologies that can have an adverse impact upon the environment.

A variety of sustainability levels are provided. In some cases, the system is capable of providing electrical energy in a completely self-sustaining mode, so that no interconnection with an existing electrical grid is necessary. The energy is fully green, in that no carbon emissions are generated or used, while supplying energy at a level commiserate with a typical household, small commercial enterprise, etc.

A number of other configurations are also contemplated. Off-grid and/or on-grid configurations can be used that utilize one or more backup power generation sources, such as propane, natural gas, batteries, generators, or other sources of power.

Still other embodiments utilize the system in a co-generation scheme whereby most of the electrical power utilized by the local user is locally generated by the system, but a system tie-in exists so that, in some cases, excess power generated by the system can be made available for use by the interconnected power system, and as required, power can be drawn by the interconnected power system to initiate or support the local generation, storage and use of energy. Grid-tied systems can be configured to supply excess electricity back to an existing grid.

Yet other embodiments can be configured as a source of generating hydrogen, which may or may not be used to generate local power. An example includes a hydrogen filling system that provides compressed hydrogen gas for suitable uses, such as for filling a fuel tank for a hydrogen fueled car, an on-demand gas supply system, etc.

Some embodiments include an input power source of electricity. The input electricity can be in the form of direct current (DC) electricity, such as from a source of solar power, wind power, etc. The input power can also be in the form of alternating current (AC) power, such as from a source of solar power, wind power, grid power, a local generator, etc. Regardless, it is contemplated in some embodiments that the input power source will take the form of solar (photovoltaic) cells, although other forms can be used including renewable energy sources such as wind turbines, geothermal generation systems, etc. In other cases, either temporarily or permanently, the input power source can be from a public utility-grid, a local generator, a battery that has stored electrical energy, etc.

The input power is supplied to an electrolyzer, also sometimes referred to as a hydrolyzer, which operates upon a supply of water ($H_2O$) from a water source to generate a stream of hydrogen ($H_2$) gas. Different forms of electrolyzers may be used as known in the art, including PEM (proton exchange membrane) and AEM (anionic exchange membrane) units. It will be noted that no particular type of electrolyzer is required, so that the system can support each of the above methods as well as any other existing or future developed methods. In some embodiments, the output stream of $H_2$ gas is subjected to a conditioning stage, such as via a dryer, to remove undesired components (e.g., water component, etc.) and purify the stream.

The output stream of conditioned (dried) hydrogen is directed, via a conduit network, for storage in a pressurized tank. While it is contemplated that the electrolyzer will generate sufficient pressure to charge the tank, further elements can be implemented or controlled as desired, such as a compressor or booster, to achieve the desired pressure. The input power is thus transformed and stored, via the electrolyzer and the tank, as pressurized hydrogen gas. While pressurized hydrogen gas is contemplated, this is not limiting; other embodiments can store the hydrogen in the form of liquified hydrogen, provided adequate control systems are in place to manage the necessary state transformation processes.

At such time that it is desired to generate electricity for local use, the previously stored hydrogen is directed in a gaseous state to a hydrogen fuel cell. The fuel cell takes the dry hydrogen and combines this with available oxygen in the surrounding atmosphere to generate (typically) direct current (DC) power. Residual condensate water is directed back to the water source. The output DC power from the fuel cell may be applied to a DC/AC inverter, which outputs alternating current (AC) power at desired frequency and phase (e.g., 60 Hz, 50 Hz, etc.) in accordance with United States, European, Asian, or other regional power formats.

The output AC power is thereafter used to drive local loads, such as the residential loading of a residential structure, the commercial loading of a commercial entity, etc. A transfer switch can be used to control the flow of power to the local residential or commercial loading in cases where such loads are also capable of being serviced by a local power grid. The transfer switch can be a separate unit, or incorporated as a part of the DC-AC inverter of the system as required.

The system can incorporate a contained knowledge base that adjusts, over time, the operation of the system to match the needs of a particular deployment. To this end, the system can further comprise various electrical and mechanical control elements including sensors to monitor the operation of the system, and a controller which provides top level control of the system. The controller performs various functions including monitoring load needs over time, adjusting the rate of operation of the various elements to meet both the current and anticipated future needs of the system, and, as required, switching in or out the application of other sources of electrical power, including an available public utility grid, a local generator, etc.

Still other embodiments presented herein provide an electrical power generation system in a grid-tie configuration in which electrical power is supplied to a load from a utility grid source and a photovoltaic (PV) source such as an arrangement of solar panels. A grid-tie inverter is used to convert output direct current (DC) power from the PV source to alternating current (AC) power. The grid-tie inverter includes sense circuitry to sense and establish appropriate voltage and phase characteristics so that the AC power from the PV source is aligned with the AC power from the utility grid source. A specially configured transfer switch arrangement is utilized to enable the PV source to continue to supply power to the local load even in the event of a loss of utility power.

The system is thus an autonomous system that can be plugged in and operated immediately upon installation. The system monitors the various components and may communicate with a cloud-based knowledge base to adjust and optimize the system operation. A local knowledge base can be maintained to provide suitable adjustments without the need to access the cloud. There is no need for human involvement in the system, such as by refilling tanks, transportation of tanks, etc. as with existing designs, although such can be incorporated as required. Moreover, there is no express need for backup mechanical systems to provide layers of energy production and supply, although such systems can be incorporated as desired.

These and other features and advantages of various embodiments can be understood beginning with a review of FIG. 1 which shows a power system 100 in some embodiments. It is contemplated that the system 100 is adapted to supply electrical power to a local residential structure. Other operational environments are envisioned so the example of FIG. 1 is merely exemplary and is not limiting. For example, the system can instead be readily configured to supply electrical power for a commercial entity, to generate compressed hydrogen (in the form of hydrogen gas or liquid hydrogen) for other purposes, etc.

The example system in FIG. 1 includes a local power generation system 102, a power utility source (grid) 104 and, as desired, an optional secondary backup generation system 106.

The local power generation system 102 is the primary focus of the present disclosure and will be discussed in greater detail below. It will be understood that the system can operate with just the local system 102, although other embodiments can have a power grid connection and/or an emergency backup generator as shown. Accordingly, since FIG. 1 shows a number of different alternatives, not all of the elements shown in the drawing need be present.

In this particular case, the residential structure remains connected to the local utility grid (source 104) but does not rely on the grid for day-to-day operations other than those described herein. The backup generation source 106 may be an internal combustion engine that runs on a suitable fuel (e.g., natural gas, propane, etc.) and may serve as an optional source of auxiliary power. Neither the utility source 104 or backup generator 106 are necessarily required, but such are provided to illustrate one form of available configuration. Other forms of backup generation power can be used, such as one or more batteries, etc.

A power transfer switch 108 interconnects the various sources 102, 104 and 106. The switch 108 can be separate unit or integrated into system 102 as desired. Block 110 represents a residential load. This constitutes all of the electrical devices that are operated by the electrical power generated by the system. This can vary widely both in overall demand (e.g., kilowatts, KW) as well as the types and time-cycles of the loads. Without limitation, components of the load can include HVAC systems, swimming pool pumps, electric car charging stations, appliances, lights, electronics, etc. It is contemplated that the peak demand by the residential load 110 will vary widely throughout each 24 hour period, as well as vary over different times of the year (e.g., greater HVAC demand during summer as compared to spring, etc.).

The system 102 is modular so that a single unit can be used, or multiple units can be incorporated and operated in unison to support higher power consumption levels. Upgrades can be incorporated into the system 102 as well (such as additional electrolyzers, fuel cells, etc.) to further enhance modularity to meet different operational environments.

Figure 2:
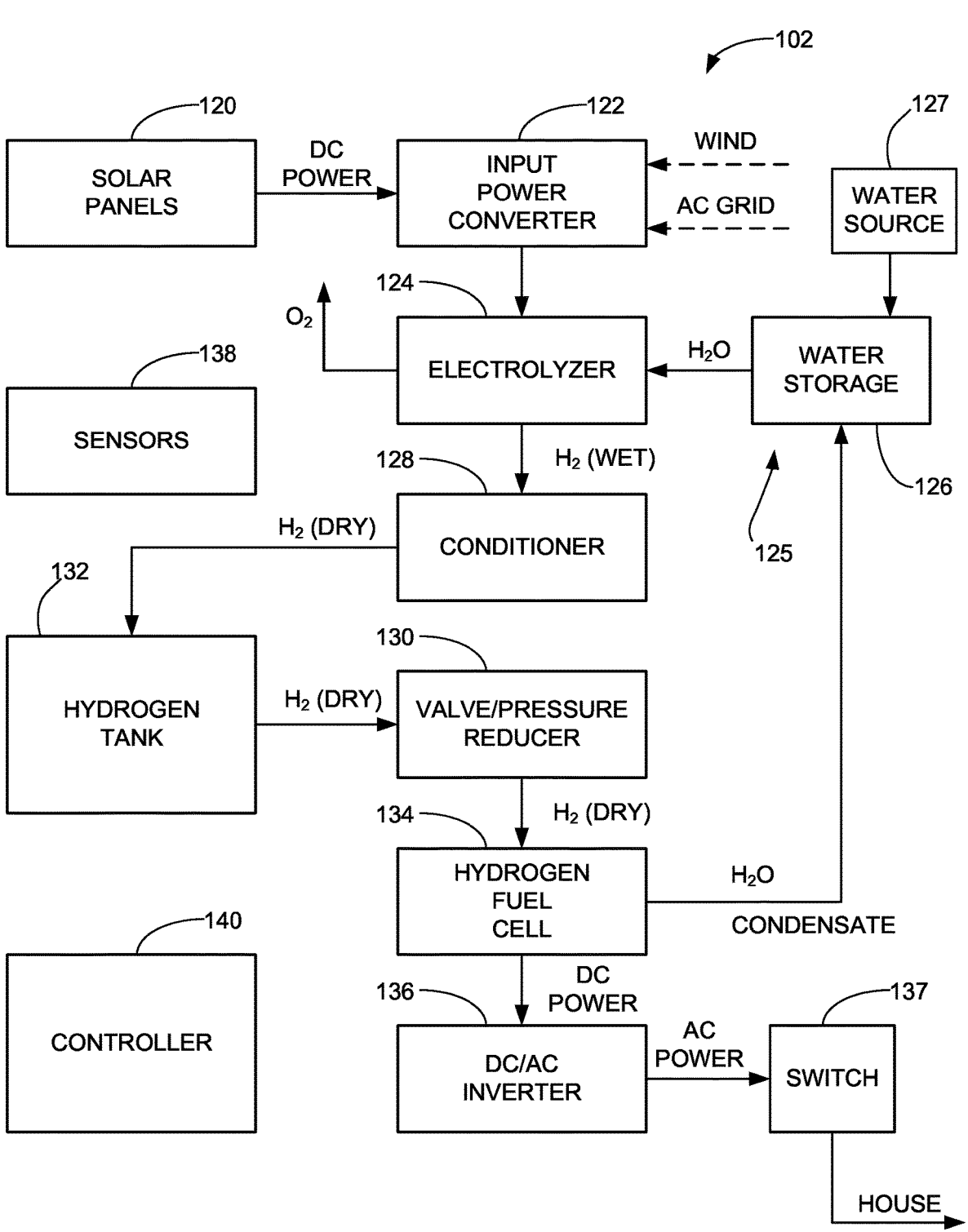
FIG. 2 is a generic functional block diagram of a local power generation system of FIG. 1 in accordance with some embodiments.

FIG. 2 shows a generic, simplified functional block representation of the local power system 102 of FIG. 1 in accordance with some embodiments. As before, the arrangement in FIG. 2 is merely for purposes of illustration and is not limiting, so that any number of other configurations can be used. A source of input power is supplied by a bank of solar (photovoltaic) panels 120. While solar panels are contemplated as being a particularly suitable form of input power, other forms can be used including other renewable energy sources such as wind power, hydroelectric power, etc. In some cases, the input power can be supplied directly from the AC power grid, from a backup generator, etc. (see FIG. 1).

The input power is provided at a suitable voltage level as a power input to an input power converter circuit 122. The circuit 122 converts the power and directs it to various elements in the system, including to an electrolyzer (hydrolyzer) 124. As noted above, the input power can be in the form of DC power, AC power, etc.

The electrolyzer 124 uses a separation process upon a stream of water ($H_2O$) from a water system 125. In at least some cases, the electrolyzer may be classified (per United States regulations) as a water gas generator (e.g., "8405.10.00.00 Water Process Gas Generator."). The water system 125 can take a variety of forms, and may include a water storage tank 126, a water source 127 with a reverse osmosis (RO) unit, etc. The electrolyzer 124 separates the input water into a stream (flow, etc.) of hydrogen ($H_2$) and a stream of oxygen ($O_2$).

The oxygen is vented to the surrounding atmosphere (or collected and stored for future use or other applications), and the hydrogen is directed to a conditioner 128. The conditioner 128 takes the "wet" hydrogen, which may have an unacceptably high level of saturated water content, to form "dry" hydrogen gas, which will have a sufficiently low level of water content and other constituent elements. As a result, the conditioner may also sometimes be referred to as a "dryer," although any number of conditioning configurations can be used.

The stream of dry hydrogen gas is directed to a hydrogen tank 132. While the tank is shown in FIG. 2 to be incorporated into the rack, as explained below other storage configurations are contemplated, such as location of the tank(s) in a remote location, such as outside a residential or commercial structure in which the other constituent elements depicted in FIG. 2 are located. In some cases, the tank(s) may be situated in a rack, may be buried underground, etc.

The tank 132 is a standard hydrogen-compatible, pressurized tank and is easily sized to provide sufficient energy storage capacity for the needs of the system. Depending on the hydrogen generating capabilities and the residential load requirements of the system, none, some, most or all of the hydrogen generated during the operation of the solar panels 120 and the electrolyzer 124 will be directed to the tank. While not limiting, it is contemplated that the electrolyzer will run and store the hydrogen gas at a separate time than when electricity is generated for local use.

The system is typically configured to generate excess hydrogen that can be stored in advance for future use. This is particularly useful for accounting for operation at night, during cloudy days, during periods of power outages, periods of snowfall that obfuscate the solar cells, windless days, etc. As long as the input power is available, the system can continue to generate and store compressed hydrogen for future use. The only practical limits upon the amount of hydrogen that can be stored are the availability of the energy source required to generate and store the hydrogen, and the storage capacity of the existing tank(s). Accordingly, by upgrading either or both of these constraints, nominally any practical amount of reserve hydrogen can be collected and ready for use. As noted above, racks of tanks, underground buried reservoirs, etc. can be expanded as required to provide the desired level of reserve power available to the system. In some cases, anticipated future needs can be augmented by the delivery and installation of additional pre-filled tanks of pressurized hydrogen (including rental tanks provided by a local commercial hydrogen gas source, etc.).

A hydrogen fuel cell 134 operates to take the hydrogen (either in-stream or from the tank) and essentially perform the reverse operation of the electrolyzer. That is, the fuel cell operates to take oxygen from the surrounding atmosphere and reactively combines this with the hydrogen to generate electrical power and water (condensate). The condensate may be directed back to the water source for reuse.

The output power from the fuel cell 134 may be in the form of DC power at a suitable voltage and current level. The DC power is directed to a DC/AC inverter 136 which outputs corresponding AC (alternating current) power for local use by the residential/commercial load 110 (FIG. 1) through an AC disconnect switch 137. As noted above, the output AC power can be in a suitable US/European/Asian format, as well as in any other desired format. It will be noted that while it is contemplated that the fuel cell outputs power in the form of DC, this is merely illustrative and not limiting, as based on configuration the fuel cell can output power in any suitable form, including AC power.

A plurality of sensors are represented at 138. The sensors are configured to sense various states of the system, including but not limited to operation of the solar panels, the electrolyzer, the tank, and the fuel cell. A number of system parameters are measured and monitored for use by a controller 140. Without limitation, these can include sensing AC presence, electrical usage levels, gas leaks, power consumption rates, water quality, filter state, and so on.

The controller 140 represents a set of control electronics that provide top level control of the system. The controller can take a variety of forms. It is contemplated albeit not necessarily required that the controller will include one or more programmable processors and associated programming (e.g., firmware, FW) that is stored in a local memory for execution. Any number of controller types can be used depending on the requirements of a given application.

Figure 3:
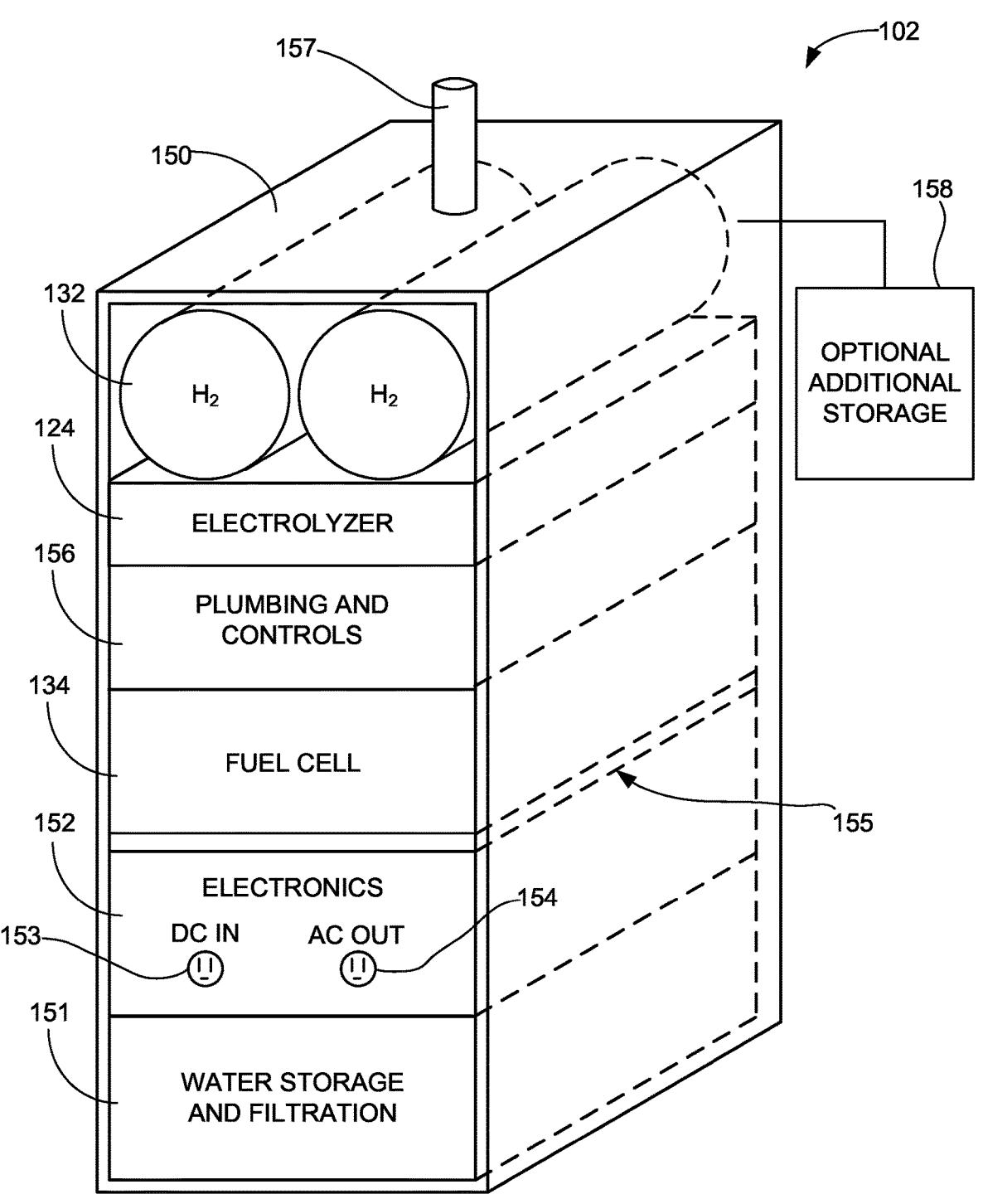
FIG. 3 is a schematic representation of the local power generation system of FIG. 2 arranged in a cabinet in accordance with some embodiments.

FIG. 3 is a schematic depiction of the local power system 102 of FIG. 2 in some embodiments. As before, this is merely illustrative and is not limiting. A "rack" or "cabinet" approach is envisioned. Other arrangements can be used. The system can be stored in a suitable location such as within a residential closet, garage, or even outdoors based on climate and upon the cabinet design. The system is modular so that additional elements can be added to expand the capabilities of the system. Multiple cabinets can be installed and hooked together as required to further expand the system capabilities. The use of multiple cabinets can allow higher voltage levels, including the generation of true three-phase AC power. The use of multiple electrolyzers in a single cabinet, or among multiple cabinets, can further increase the rate at which hydrogen gas is produced and stored. At this point, it will be noted that while currently discussed embodiments are directed to residential/commercial entities, other applications can readily be implemented, including on a boat, a micro-grid, etc.

The system 102 includes a cabinet (rack) 150 in which the various components from FIG. 2 can be conveniently located. While not limiting, the overall dimensions of the cabinet may be similar to those of a standard 42U-48U server cabinet of the types used in data centers. Other form factors may be used, so this is merely for purposes of illustration. One embodiment contemplates an overall rack size of approximately 22 inches (in.) wide by 76 in. high by 41 in. deep. These dimensions are typical and are not limiting. It will be noted that, regardless of configuration, the design is "small" compared to typical generation equipment.

The cabinet 150 includes various elements including a water filtration system 151 at the base of the system. This includes the various elements from FIG. 2 such as the water source, the RO unit, the tank(s), etc. While not separately denoted in the figure, sensors can be supplied to measure various parameters such as a TDS (total dissolved solids) level of both the input and output water. Solenoids can be supplied to regulate the water flow, etc. The water can be supplied from a separate source, or can be provided via a tank, etc.

An electronics module 152 can incorporate the various electronics of the system such as the input power converter 122, the inverter 136, the controller 140, etc. It will be noted that, generally, the system 102 may have two (2) input connections (solar, grid) and one (1) output connection (load); as shown, an input power terminal 153 admits input power from the solar panels (or other input power source), and an output power terminal 154 outputs the generated electrical power. The power connections will depend upon the configuration of the system; a totally off-grid system will receive the power from the solar panels, batteries, wind generation, tidal system, generator, etc. A tied-in system may alternately receive the power from such systems or a grid, etc. These and other considerations will readily occur to the skilled artisan, and further example configurations in accordance with these and other alternatives are discussed below.

An optional separation layer 155 (when used) can be disposed between the electronics module and remaining portions of the system that process the various gasses (hydrogen, oxygen, air, etc.), such as the hydrolyzer 124, the tanks 132, the fuel cell 134, etc. A plumbing and controls module 156 directs the inputs and outputs for these elements. This module may include various pressure regulation, flow control, safety modules, etc.

It will be noted that FIG. 3 shows the use of two of the hydrogen tanks 132 mounted at the topmost portion of the cabinet 150. While this location for the tanks can be used, it has been found advantageous to instead locate the tanks elsewhere, including outside the structure in which the rest of the elements in FIG. 3 are located, as discussed below. It will be noted that hydrogen is lighter than air and is relatively flammable, so it is prudent to place the electronics at the bottom and the hydrogen at the top (or outside). An optional vent 157 with a fan (not separately shown) can be used to vent any excess hydrogen to a safe location. While the cabinet is shown to be substantially "full" for purposes of pictoral demonstration purposes, it will be appreciated that additional space can be provided to accommodate additional elements to increase the power storage and generation capabilities of the system (e.g., another electrolyzer, another fuel cell, etc.). Additional hydrogen storage 158 can further be incorporated into the system, such as through the use of additional tanks, etc.

Figure 4:
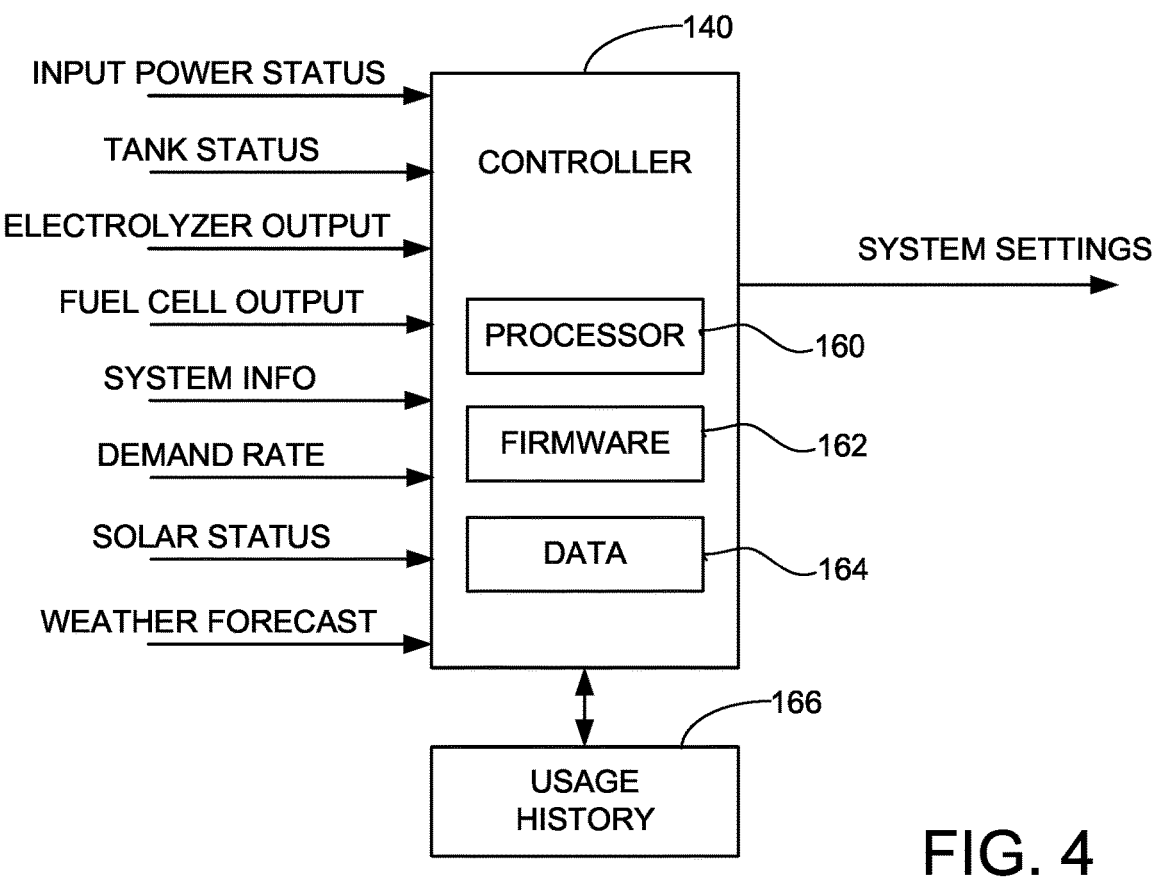
FIG. 4 shows operation of a controller of the system of FIGS. 2-3 in some embodiments.

FIG. 4 shows a functional block representation of the controller 140 in further embodiments. The controller includes a programmable processor 160, firmware 162 and data 164 used by the processor during operation. Block 166 represents additional storage (such as in the form of a local storage device) that accumulates, as a history log, usage history data from the system. The controller operates to collect and apply analytics associated with the operation of the system. As explained below, the analytics and other information can be stored locally as well as remotely, can be displayed on a user device, etc.

As shown in FIG. 4, the controller receives a number of system inputs such as but not limited to input power status, tank status, electrolyzer and fuel cell output values, and other information such as pressures, flow rates, etc. (collectively, "system info"). Still other information can be supplied as desired, such as the status of solar panels, weather forecast information, etc. The controller is adaptive and can utilize outside information to help predict and adaptively configure the system. This enables the system to be autonomous to the user. For example, if the National Weather Service predicts a large snowfall (or other inclement weather) that may affect the ability of the solar panels to generate power in the coming days, additional steps may be taken to accumulate higher than normal levels of hydrogen. Other adaptive operations can be taken as required to ensure operation of the system meets the ongoing (including seasonally changing) needs of the local residential/commercial load.

In some cases, operational data sets may be collected and transmitted to a remote server network (e.g., data center, etc.) that may house a knowledge database that can be used to help reprogram, upgrade or otherwise configure the system on the fly as required. The conveyed information may be protected using suitable security protocols, such as encryption, blockchain techniques, hashes, digital signatures, certificates, etc., and may further be stored in one or more secure locations so that the data cannot be accessed by anyone but authorized agents.

Figure 5:
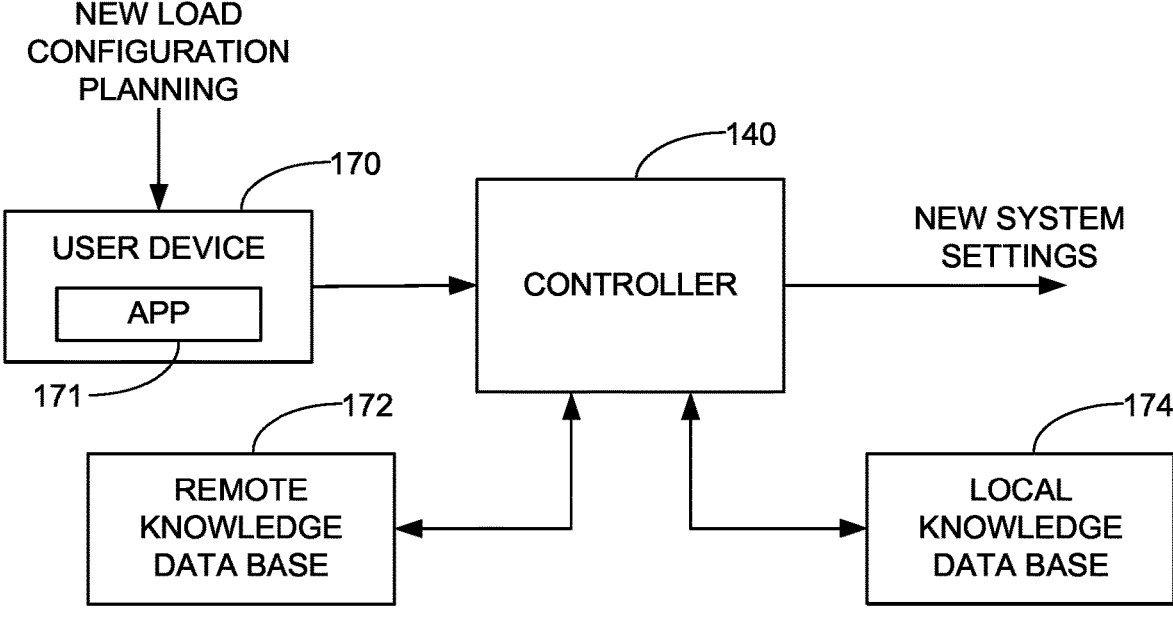
FIG. 5 shows user configuration of the controller in further embodiments.

FIG. 5 shows a further configuration of the controller 140 in communication with a user device 170. The device 170 can take any number of desired configurations including a smart phone, a tablet, a laptop computer, etc. One or more applications (apps) 171 can be stored locally and accessed by the user to manage the system. Generally, the user can input information such as new load configuration to assist the controller in planning the operational settings required to meet these needs. It will be noted that, while such user interfaces (when used) will allow user inputs to configure the system, safety protocols may be implemented such that no dangerous systems can arise; for example, flows of pressurized gas, voltages, storage of power, etc. will have built in protocols to ensure that the system is safe for the users at all times, irrespective of any inputs that may be supplied by a user input interface.

For example and not by way of limitation, the user may indicate that a new electric car has been purchased, and thus there will be a significant increase in electrical demand at night on a going forward basis while the car is being recharged. The controller can take the necessary steps to either accumulate sufficient charged hydrogen to meet this need, or make other arrangements such as activating the transfer switch to allow the lower power grid to supply the necessary additional power to meet this new load requirement.

In some cases, the app(s) 171 can be user apps, in which information is displayed concerning system operation, queries can be input to obtain system information and performance, etc. In other cases the app(s) 171 can be system administration level apps that allow system requirement, configuration, upgrade and other changes to the system. In this way, adequate safeguards can be implemented to ensure that only authorized personnel make changes to the system.

A remote knowledge data base is represented at 172 and can be used to further assist in the configuration of the system. In related embodiments, the system may itself detect changes in load requirements and make the necessary changes to energy storage and generation independently of user inputs. System interfaces may be supplied to allow those who monitor the system remotely to diagnose and effect useful changes to best meet current and future needs. The remote knowledge data base 172 may be arranged to store, analyze and track system information at a remote location (e.g., remote server, cloud computing environment, etc.). A local knowledge data base 174 can additionally or alternatively be used to provide local accumulation and analysis of system parameters and other data, enabling localized control (including system adjustments) without the need for a communication link across a network to a remote server, etc.

Figure 6:
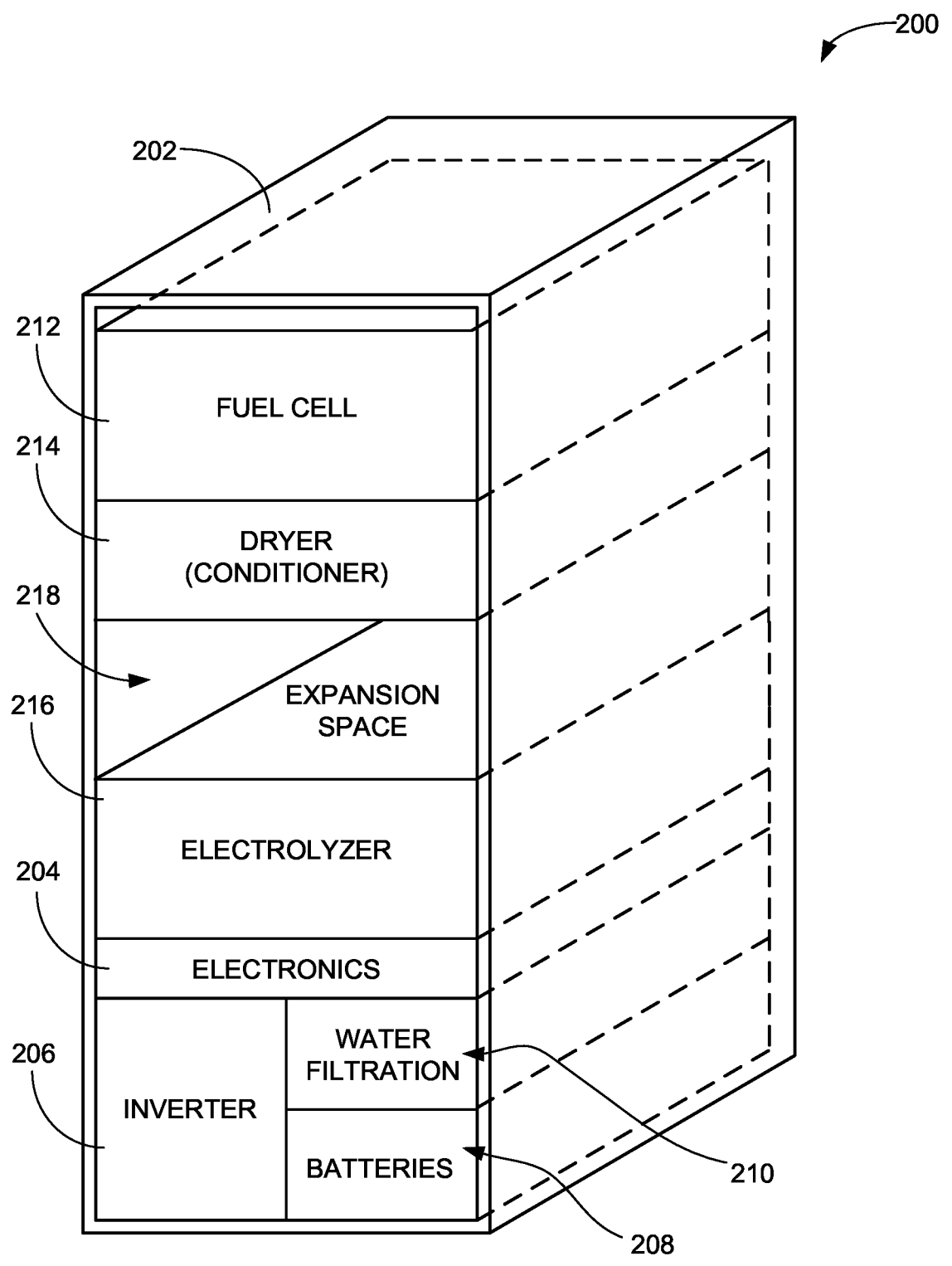
FIG. 6 shows an alternative local power generation system that can be incorporated into the system of FIG. 1 in further embodiments.

FIG. 6 shows another local power system 200 similar to the system 102 described above. Other configurations and arrangements can be used. As before, the system 200 is arranged in a rack 202 which may be sized similarly to the rack 150 discussed above. Various components include control electronics 204 (including one or more controllers), an inverter 206, local batteries 208, a water filtration system 210, a fuel cell 212, a dryer (conditioner) 214 and an electrolyzer 216. Space 218 may be provided to accommodate additional components (e.g., a second fuel cell, a second electrolyzer, etc.). Other elements may be incorporated but are not shown in the drawings for ease of illustration.

While not limiting, the system 200 may be capable of generating/outputting an energy level on the order of about 4 kilowatts (kW). Other levels can be used, including levels higher or lower than this level. Example other levels can include nominally 1 kW, 2.5 kW, 8 kW, 15 kW, etc. One currently suitable source for the inverter is Victron Energy B.V., The Netherlands. A currently suitable source for the fuel cell is Intelligent Energy Inc., Cupertino, California, USA. A currently suitable source for the dryer and the electrolyzer is Enapter SRL, Crespina Lorenzana, Italy. The control electronics can incorporate one or more programmable processors, local memory (including SSDs, HDDs, etc.), controller elements, communication circuitry, etc. Other sources and configurations of components can be used as desired, so these are merely illustrative and are not required.

Various plumbing and electrical interconnections (not separately shown) are established between and among these various components, such as adjacent the rear of the cabinet. The components cooperate as generally described above to generate a supply of hydrogen gas, which is stored in a remote location.

Figures 7, 8A, 8B:
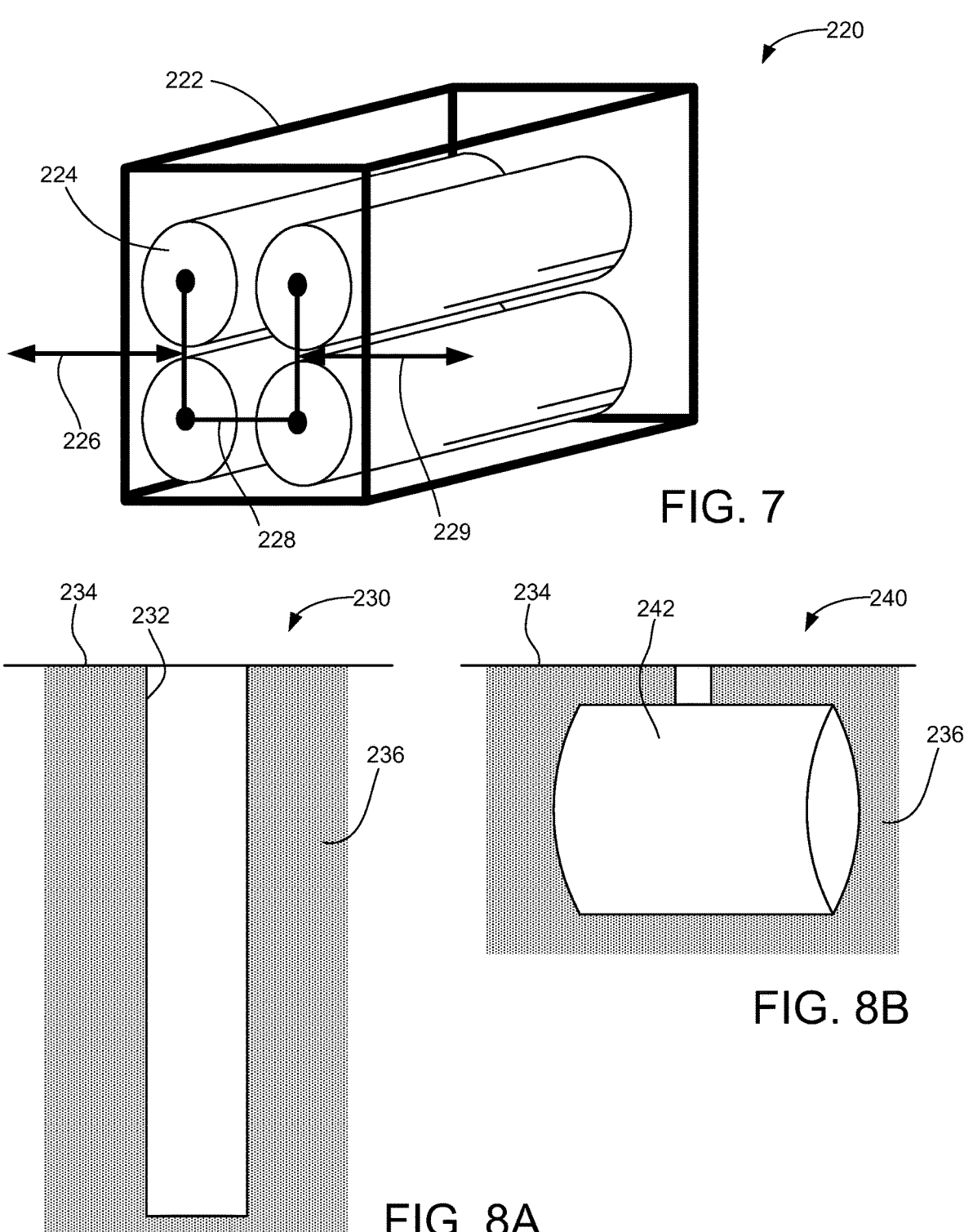
FIG. 7 depicts a remote hydrogen gas storage system 220 in some embodiments.
FIGS. 8A and 8B depict alternative remote hydrogen gas storage systems 220 that can be incorporated in other embodiments.

FIG. 7 schematically depicts one embodiment of a remote hydrogen gas storage system 220 having an external rack 222 that is arranged to mechanically support and protect one or more hydrogen gas tanks 224. Suitable valving, manifolds, pressure gauges, pressure relief valves, etc. are incorporated into the system, but such have been omitted for clarity of illustration. Similarly, while the rack 222 is depicted as an open rack in order to illustrate the tanks 224, it will be understood that the rack can form a portion of an enclosed, weatherproof structure. Such enclosed, weatherproof structures can also be used in situations where it is desirable to locate the system rack 202 (see FIG. 6) outdoors or in an otherwise harsh environment. Each of these types of structures can be cosmetically covered with plastic, wood, metal, shingles, etc. to resemble a typical storage shed, storage cabinet, or the like.

A pressurized supply line 226 extends from the system 200 in FIG. 6 to interconnect with the tanks 224 to transfer hydrogen to the rack 220. A manifold 228 can be used with appropriate valving, etc. (not separately shown) to provide the hydrogen to and from the respective tanks 224. A downstream transfer path 229 can extend to a secondary storage location/arrangement. While a total of four (4) tanks 224 are shown, other suitable numbers/sizes of tanks can be used, including a single tank, less than four, more than four, etc. Tanks can further be provided in multiple storage locations, etc. Locating the tanks away from the system 200 provides a number of advantages including safety, ease of maintenance, etc.

FIGS. 8A and 8B show alternative underground storage solutions for the remote storage of the hydrogen gas. FIG. 8A shows a system 230 formed by a vertical casing 232, that extends vertically from ground level 234 into subsurface strata 236. The vertical casing can extend to substantially any depth and may comprise a cylindrical pipe or other structure inserted into a vertically extending hole. The pipe is sealed at each end and configured as before to accommodate a large volume of compressed hydrogen gas. FIG. 8B shows a system 240 with a horizontally extending tank 242 that has been buried in the subsurface strata 236. Other storage configurations can be used so the foregoing examples from FIGS. 7 and 8A-8B are merely illustrative and are not limiting.

Figure 9:
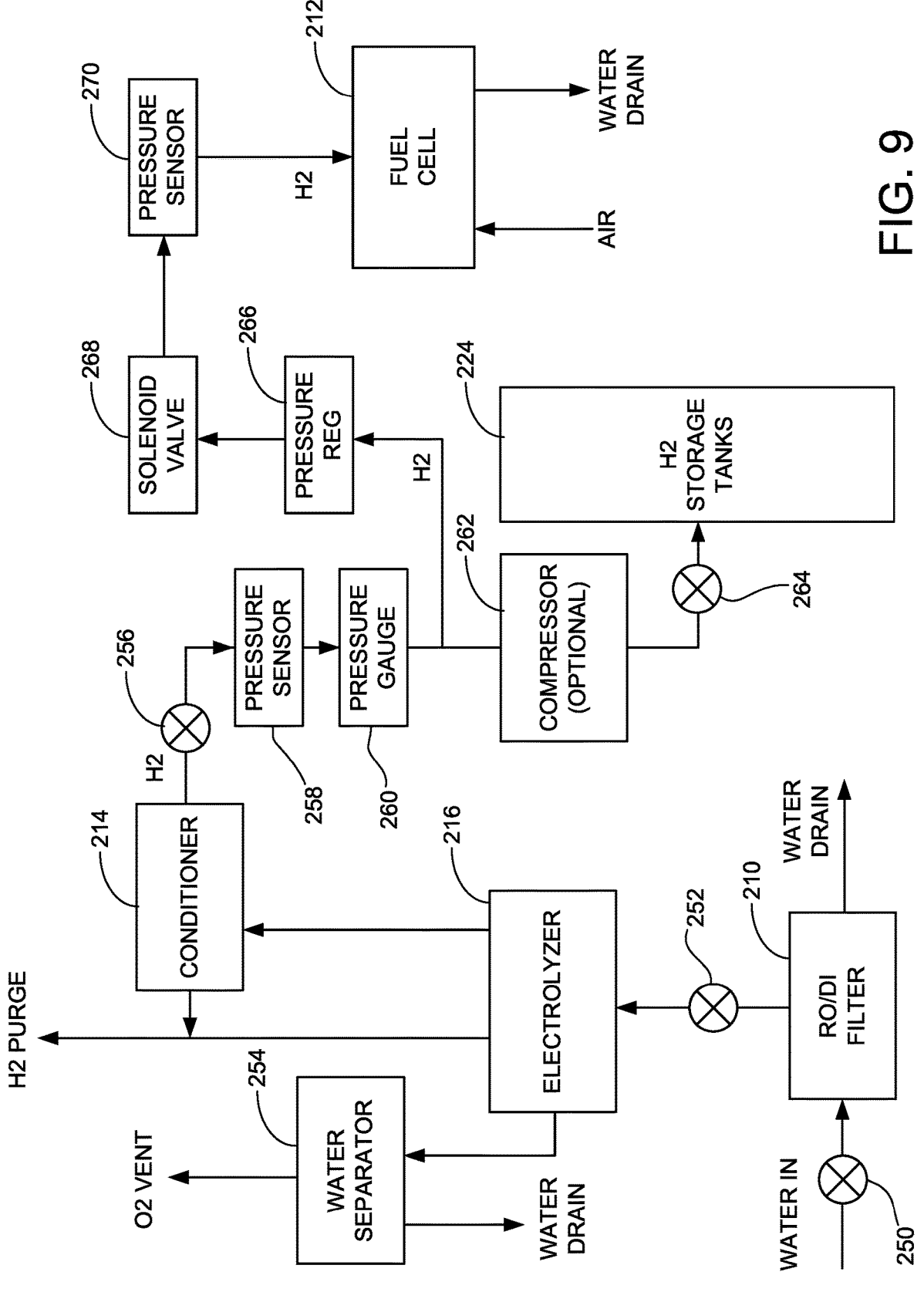
FIG. 9 is a fluidic flow diagram to illustrate operation of the system 200 in some embodiments.

FIG. 9 is a generalized flow diagram to illustrate further aspects of the system 200 of FIG. 6 in some embodiments. Additional elements may be incorporated into the system as desired, but such are unnecessary for a clear understanding of the operation of the system.

Beginning in the lower left-hand corner of FIG. 9, water is inlet from a source (not separately shown) through a control valve 250 to the filter 210, which may include a reverse osmosis (RO) or distilled (DI) process. Excess water may exit via a drain as shown. A stream of filtered water is directed through valve 252 to the electrolyzer 216, which operates as discussed above to separate the water into constituent O2 and H2 gas streams. The O2 is processed via a water separator 254 which returns water to the water drain and vents O2 gas to the surrounding atmosphere. The H2 is supplied to the conditioner 214 which operates as described above to generate a flow of dried, conditioned hydrogen gas. While not limiting, in some examples a system configured as depicted in FIG. 9 was found to provide an initial flow of hydrogen gas from the electrolyzer at a rate of about 99.5% H2 by weight. After being processed by the conditioner, the stream was increased to a rate of about 99.999% H2 by weight.

The H2 gas from the conditioner 214 passes through successive stages including a control valve 256, pressure sensor 258 and pressure gauge 260. While the sensor and gauge can be configured to provide human readable indications, it is contemplated that these will additionally or alternatively provide electronic indications to the control electronics 204 for automated sensing and, as necessary, activation. Similarly, while the various control valves may be configured for manual human operation, these can additionally or alternatively be electronically controlled and adjusted as required.

During a storage cycle, the hydrogen is passed to the storage tank(s) 204 through one or more additional elements, such as an optional compressor/booster 262 and an inlet/outlet control valve 264. The compressor/booster may be utilized to increase the pressure of the stored hydrogen gas. Suitable pressure values may be in the range of from about 500 pounds per square inch (psi) to 2200 psi or more. Other values and ranges can be used, including psi levels significantly higher than this range. As desired, a compressor stage can be used to generate liquified hydrogen for storage in some applications.

While not necessarily required, it is contemplated that hydrogen generation and electricity generation operations will not normally be carried out simultaneously; rather either one or the other modes will be activated at a time. This routing can be controlled such as via an intervening control valve (see e.g., solenoid-activated valve 268, which will be arranged within the system to effect this purpose such as through the use of a common manifold not separately shown). In this way, a "first" stream of hydrogen gas generated by the electrolyzer 216 can be directed to the storage tanks 224, and a subsequent, "second" stream of hydrogen gas can be output from the storage tanks for use in generating electricity.

During an electricity generation cycle, hydrogen will be routed from the storage tanks 224 to a pressure regulator 266 to reduce the hydrogen to a suitable pressure level. The hydrogen flows through the solenoid-activated valve 268 and a pressure sensor 270 to the fuel cell 212.

The fuel cell 212 operates to combine the inlet hydrogen gas with oxygen (O2) to generate electricity in the manner described above. The resulting water generated during this operation may be forwarded to the water drain as before. While it is contemplated that the O2 will be utilized from the surrounding air, it is contemplated in some cases it may be advantageous to collect and store the purged O2 from the water separator 254 for this purpose.

FIGS. 10-13 show different configurations of electrical power systems (e.g., 100, FIG. 1) that can be used incorporating the local power system 200 of FIG. 6. Additional configurations can be used as well. These diagrams largely depict electrical flow through the system. As such, various previously described components of the system have been omitted for simplicity of illustration.

Figure 10:
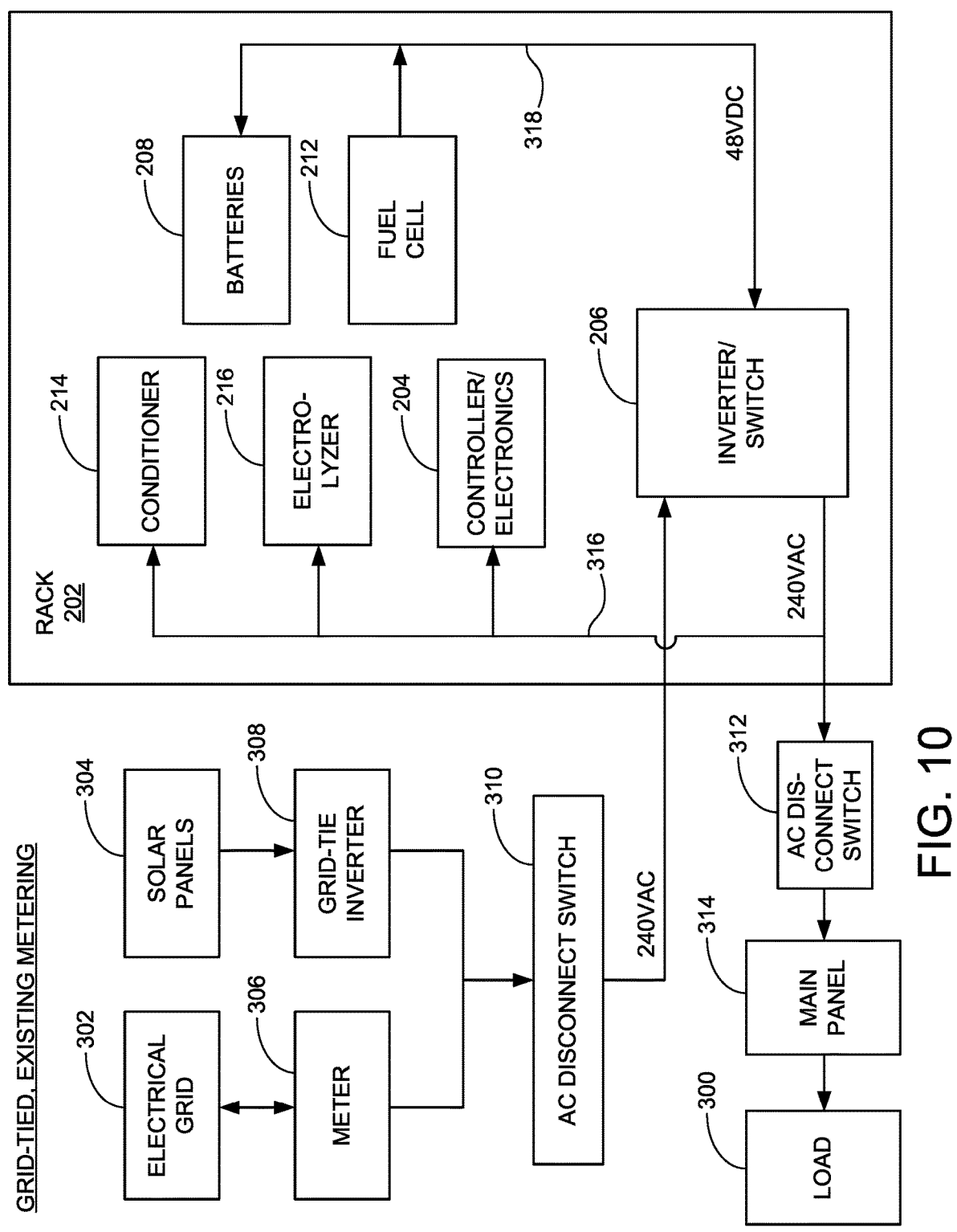
FIG. 10 is an electrical interconnection diagram for a so-called "Grid-Tied, Existing Metering" configuration for the system.

FIG. 10 shows a functional block diagram for a so-called "Grid-Tied, Existing Metering" configuration. Generally, in this configuration electricity is supplied to a load (in this case, a residential load) 300 using both an electrical power grid 302 as well as a source of local power, such as a set of solar panels 304. As noted above, other forms of local power can be utilized in this scheme including but not limited to wind power, etc. While not limiting, the arrangement in FIG. 10 is contemplated as a co-generation arrangement so that, as circumstances permit, power is primarily generated by the solar panels 304 and augmented as necessary by the electrical grid 302. The net consumption from the grid 302, as measured by an energy meter 306, is thus whatever additional power is required over and above that which is generated by the solar panels 304.

It will be appreciated that the grid 302 represents electrical power supplied from a power company source (e.g., an electric utility company, etc.). Any extra power generated by the solar panels and not used by the system can be sent to the grid for credit.

A grid-tie inverter 308 is used to tie the solar panels 304 to the grid 302 and allow nominally (in this example) 240 VAC to flow through an AC disconnect switch 310 to the inverter 206. The system services the main residential load 300 by outputting 240 VAC from the inverter 206 through a second AC disconnect switch 312 and a main panel (circuit breaker service) 314. Hydrogen is stored as described above as excess power is available.

In the event of a loss of power from the grid 302, the inverter is signaled and the system changes the system configuration to compensate for the lost grid power. In some embodiments, the system uses the available power from the solar panels. Any excess power beyond the needs of the load can be used to generate additional hydrogen. If the power needs are insufficient from the solar panels, the system can utilize the previously stored hydrogen (in whole or in part with what power is available from the solar panels). This system is advantageous in situations where a net metering system is already in place (e.g., elements 302-308), so that the system can be upgraded substantially by installing the local power system 200 (FIG. 6) upstream of the main panel 314.

The 240 VAC output from the inverter 206 is directed (via a 240 VAC bus 316) to some elements of the system rack 202, including the conditioner 214, the electrolyzer 216 and the control electronics 204. A separate transformer/power supply (not separately depicted) can be utilized to generate the necessary low voltages (e.g., 3 VDC, 5 VDC, 12 VDC, etc.) used by the control electronics.

A separate DC bus 318 is further interconnected in the system to supply a suitable direct current voltage, such as 48 VDC as shown. This 48 VDC bus 318 interconnects the inverter 206, batteries 208 and the fuel cell 212. The batteries 208 are contemplated as being rechargeable, and provide the necessary power to keep the fuel cell ready to be utilized.

Figure 11:
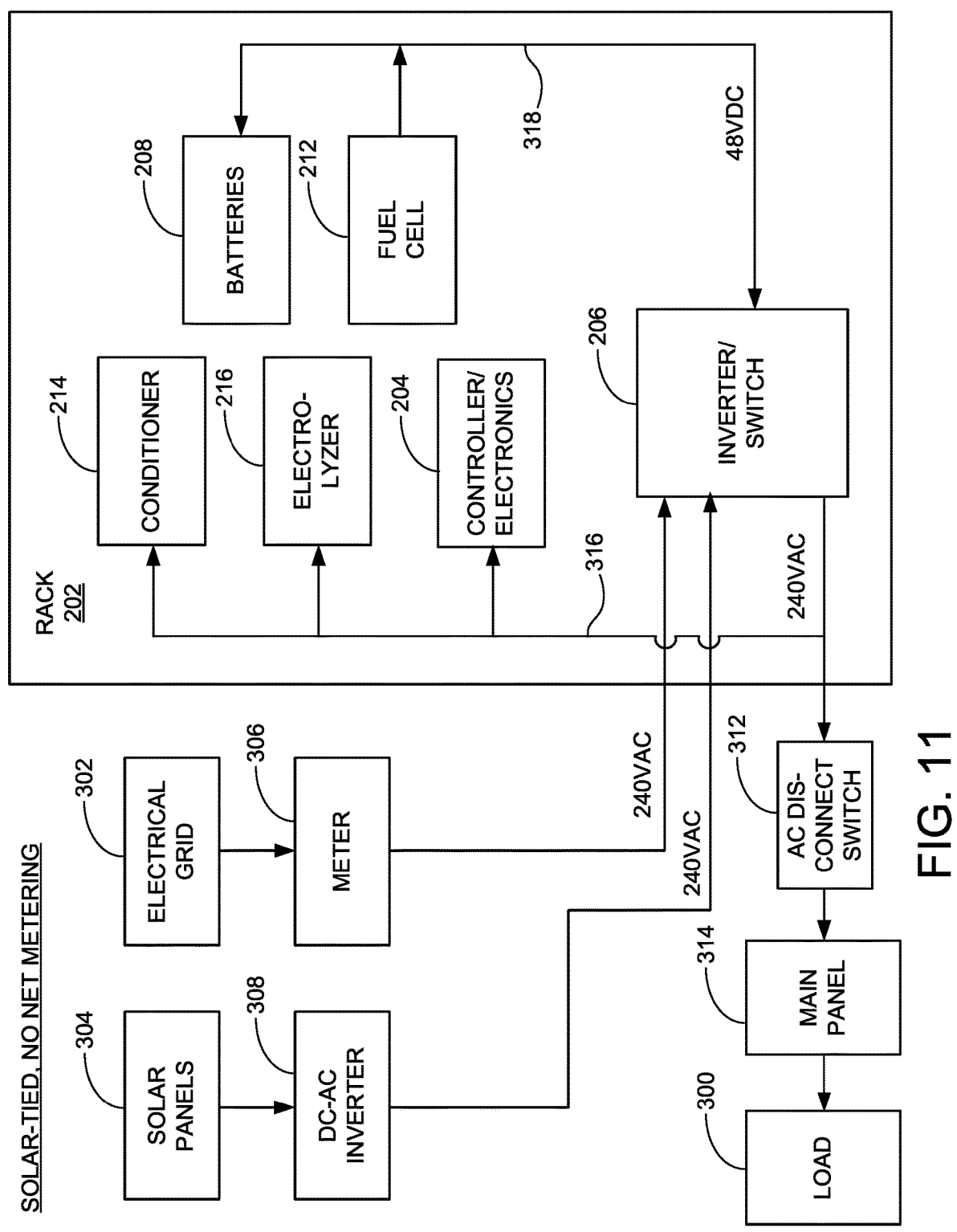
FIG. 11 is an electrical interconnection diagram for a so-called "Solar-Tied, No Net Metering" configuration for the system.

FIG. 11 shows a functional block diagram for a so-called "Solar-Tied, No Net Metering" configuration. Generally, this configuration is similar to that of FIG. 10, including on the basis that FIG. 11 is configured to receive input power from both the electrical grid 302 and from a set of solar panels 304 (or other renewable energy source). However, this system does not tie the grid and the solar panels together. Instead, the system primarily uses the power from the solar panels, and uses the grid only as needed. The system chooses the best power source (e.g., grid, solar or stored hydrogen) based upon various efficiency rules established by the knowledge base. In most cases, the system will primarily use solar power, will switch in H2 when solar is unavailable, and use grid power as a last resort. Other operational configurations can be used as desired.

Figure 12:
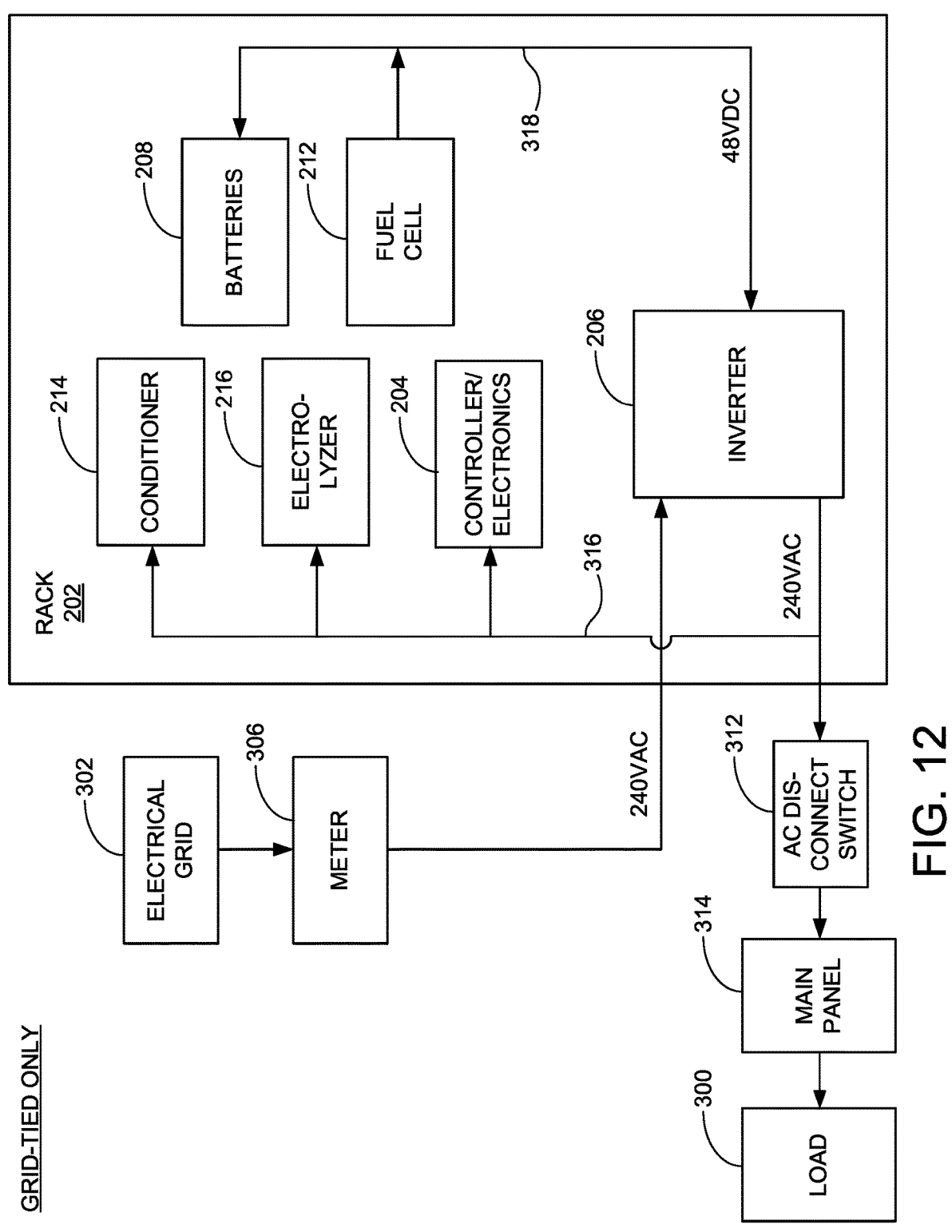
FIG. 12 is an electrical interconnection diagram for a so-called "Grid-Tied Only" configuration for the system.

FIG. 12 shows a functional block diagram for a so-called "Grid-Tied Only" configuration. This configuration does not utilize local renewable power such as the solar panels discussed above. Instead, connection is made to the electrical grid 302 which is the normal source of input power to the system. This system (as well as the other systems described herein) can enable the user to take advantage of shifts in power rates at different times of a typical 24 hour cycle. At times when power rates are lower, such as overnight, electricity can be utilized from the grid to power the (usually reduced) residential loads 300 as well as to generate stored hydrogen gas. At times when power rates are higher, such as in the afternoon, power can instead by supplied by the previously stored hydrogen gas. As before, in the event of a grid power failure, emergency backup power can continue to be supplied to the load using the stored hydrogen gas.

Figure 13:
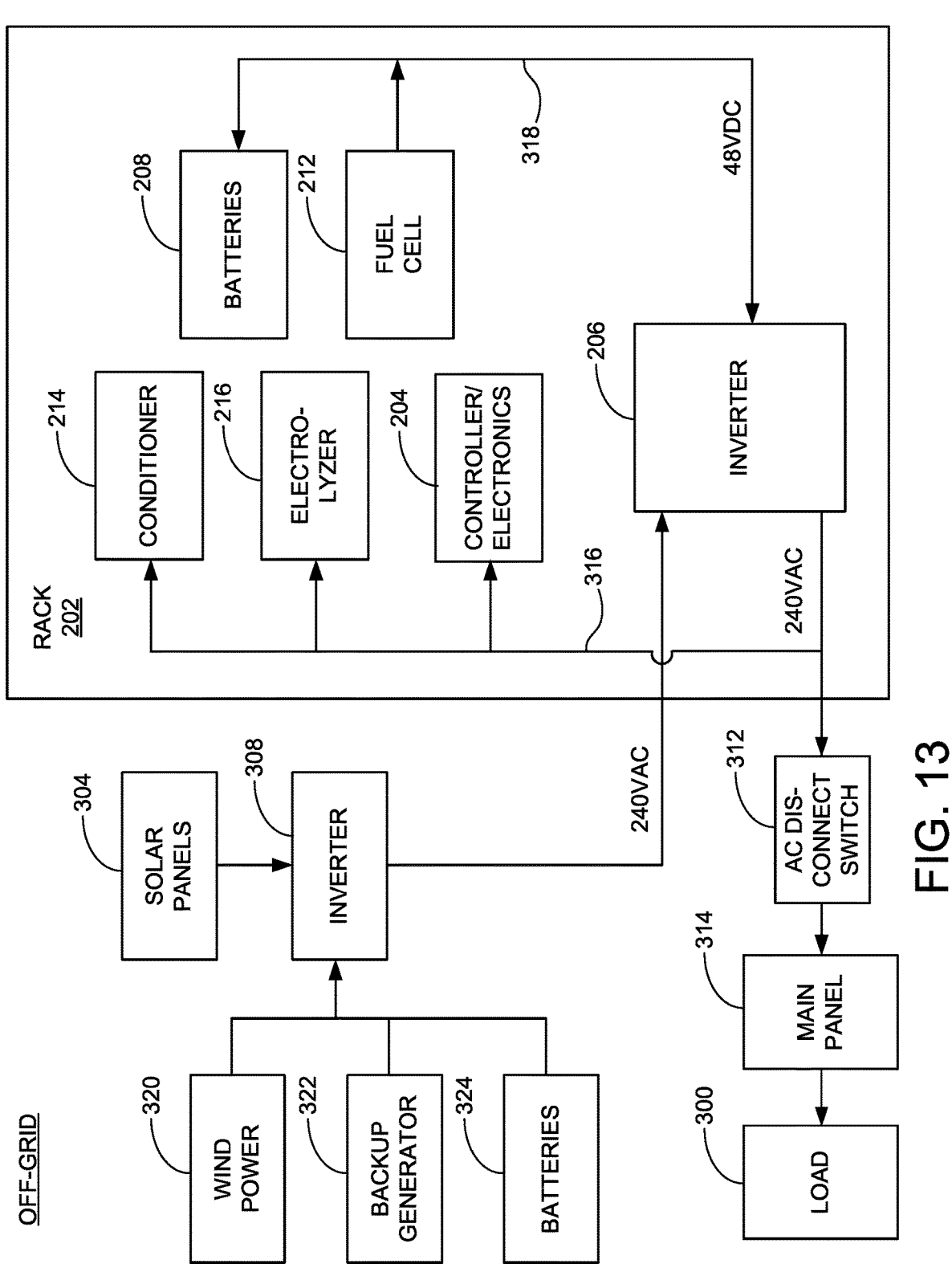
FIG. 13 is an electrical interconnection diagram for a so-called "Off-Grid" configuration for the system.

FIG. 13 shows a functional block diagram for a so-called "Off-Grid" configuration. This is similar to FIG. 11 except that there is no grid connection at all. Instead, power is supplied from one, and preferably multiple, sources of renewable or backup power, such as solar panels 304, wind power generator 320, emergency backup generator 322, batteries 324, etc. As noted previously, the wind power generator 320 may incorporate a windmill turbine with electrical generation capabilities to generate power from wind energy; the emergency backup generator may incorporate an internal combustion engine to drive an electrical generator; the batteries may store energy in a chemical form, and so on. These secondary backup systems can generate AC or DC power. If AC power is generated, the power may be routed directly to the inverter/switch 206; if DC power is generated, the power may be first routed through the AC-DC inverter 308.

The off-grid system of FIG. 13 is useful for remote locations where grid power tie-ins are inaccessible, undesired and/or unavailable. While not shown in FIG. 13, an off-grid system can further be configured to direct a portion of the stored hydrogen gas to various appliances (e.g., compressors, furnaces, cooktops, water heaters, etc.). This would allow a home or small commercial enterprise to have complete energy independence.

Figures 14, 15, 16:
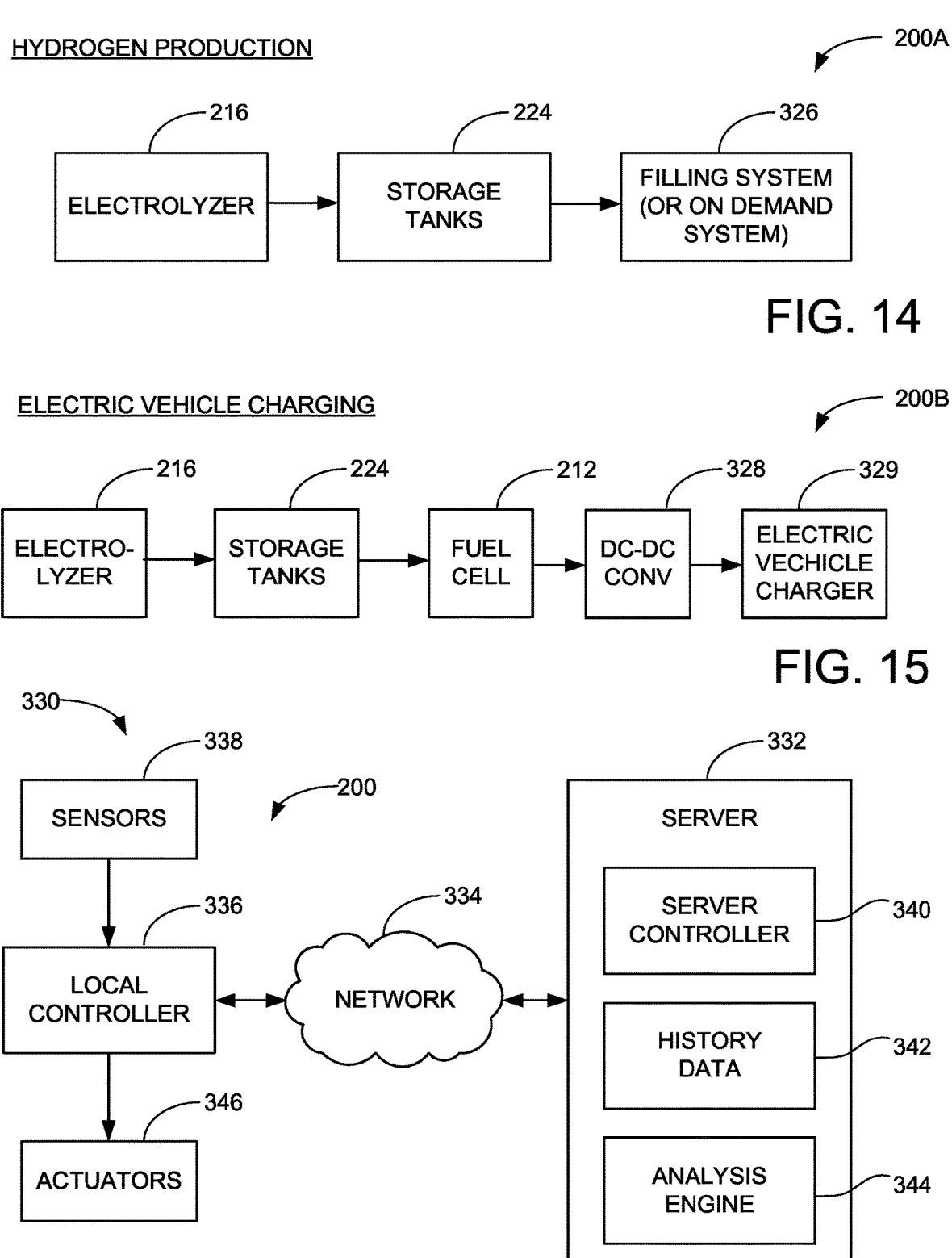
FIG. 14 shows the system in accordance with a "Hydrogen Production" configuration.
FIG. 15 illustrates another embodiment in which the system provides an "Electric Vehicle Charging" configuration.
FIG. 16 depicts a data communication and processing system in accordance with some embodiments.

While the system as variously embodied thus far has been configured to generate electrical power from the stored hydrogen gas, other embodiments are contemplated. FIG. 14 shows aspects of another system 200A. The system 200A is similar to the system 200 described above, except that the system 200A is primarily configured to generate and dispense hydrogen gas, such as to a hydrogen powered vehicle (e.g., an automobile, a truck, a forklift, etc.). Alternatively, the system 200A can be configured for on-demand usage situations such as a furnace, a refinery, or other processing needs that require a stream of hydrogen gas.

To this end, the electrolyzer 216 generally operates as described previously to generate a conditioned flow of hydrogen gas, which is temporarily stored in the storage tanks 224. A filling system 326 is additionally provided which receives the stored hydrogen gas and dispenses the same into the desired target receptacle. The system 200A can be dedicated to the production and dispensing of the stored hydrogen, and/or can additionally incorporate the necessary components (e.g., fuel cell, etc.) to also generate electrical power as needed, to output a stream of hydrogen for local needs (appliances, etc.). FIG. 14 thus provides another example of an energy-independent capable configuration.

FIG. 15 shows another alternative system 200B similar to those systems described above. The system 200B has a further capability of charging a battery-based electric vehicle (e.g., an electric automobile or truck, a forklift, etc.) that uses one or more large capacity batteries. As will be recognized, it is common to charge the batteries at times when the vehicle is not in use, such as overnight. Of course, the system 200B can be adapted for other uses, such as charging batteries for other purposes.

As before, the electrolyzer 216 cooperates with the other elements of the system to store hydrogen in the tank(s) 224. The hydrogen is subsequently directed to the fuel cell 212 to generate (in most cases) DC power at a first DC voltage level (such as nominally 48 VDC as described above).

In situations where a different DC voltage level is required for the charging operation, a DC-DC converter 328 can be used to step up or step down the DC voltage to a second level. An electric vehicle charger 329 (or similar) establishes the necessary interconnection to charge the batteries of the electric vehicle (or other battery based application) using the second DC voltage level. As before, the system can be dedicated as a battery charging system, or can be further configured to additionally supply AC or DC power for other loads as set forth above.

FIG. 16 shows a functional block representation of a data communication and processing system 330 in accordance with further embodiments. In FIG. 16, the system 200 is connected to a server 332 using a suitable network 334. The server 332 can be a remote server geographically distant from the system 200, such as in a data center or other cloud based environment. The server 332 can additionally or alternatively be located locally. Hence, the network 334 can comprise a local area network, a wide area network, a wireless network, the Internet, etc. or any combination of these or other configurations.

As described previously, the system can operate using a knowledge base that monitors, tracks and optimizes the operation of the hydrogen generation, storage and utilization processes. The local system 200 thus includes a local controller 336 (similar to the controller described above) that receives various parametric inputs from various sensors (collectively denoted at 338). In some embodiments, these and other values may be communicated to the server 332 via the network 334.

The server 332 may include a server controller 340, which processes the data received from the system 200. This can include storage of the system data in a history database structure 342 in server memory, and analysis of the data using an analysis engine 344. As before, both of the controllers 336, 340 may be realized using one or more programmable processors that execute program instructions stored in an associated memory, but can also or alternatively incorporate other forms of processing such as hardware circuits, ASICs, industrial controllers, etc. in order to carry out the requisite functions.

In some cases, the analysis engine can be used to direct information back to the local controller 336 for various actions, collectively referred to as actuators 346 (e.g., activation of switches, valves, transfer operations, etc.). The analysis engine can additionally or alternately provide feedback to a user device of the system 200. In this way, improved performance can be obtained over time, including anonymous information based on information gleaned from other users of similar systems. As before, it is contemplated the local controller 336 can also have the requisite functionality to automate and optimize the operation of the system apart from the operation of the server 332. Constant network connectivity is not required.

Remote and local knowledge data bases (see e.g., 172, 174 in FIG. 5) can be separately used as needed. Alternatives include no remote connection being required, so that the local knowledge data base is sufficient; periodic interconnections can be carried out at suitable times to transfer data from the remote knowledge data base to augment the local knowledge data base; and so on.

In some cases, the knowledge data base(s) can allow analysis trends to be established based on actual performance (both power generation and power utilization) to best configure the system, including but not limited to when to switch between multiple available power sources, when to switch to the generation of hydrogen gas, when to switch to the use of the hydrogen gas to generate power, how much hydrogen gas to have on-hand to meet anticipated needs, how much reserve secondary power to maintain (e.g., fuel for electrical generators, storage levels of backup batteries, etc.) based on expected changes to the system (e.g., a forecast blizzard or other storm, etc), and so on. Smart house capabilities can be incorporated into or interfaced with the controller to make decisions on which loads to use and which loads to disengage to manage an existing power budget.

In one example, if anticipated grid failures are contemplated based on seasonal reasons (e.g., hurricane season, fire season, etc.), changes to a baseline level of operation can be enacted. A first profile can be established for operation of the system under normal conditions, and a second profile can be established for operation of the system under abnormal conditions. Over time, trends can be accumulated throughout the year so the profiles can be adjusted on a seasonal (e.g., winter, summer, spring, fall) basis, on a monthly basis throughout the year, on a weekly basis, on a daily basis, etc.

As noted above, external information can additionally be implemented into the system. Weather forecast information, such as forecast high and low temperatures (both daily and multi-day outlooks) can be utilized to estimate load, storage and generation levels and schedules. Other types of information can be similarly used. Neural networks, AI, machine learning systems, etc. can be incorporated locally or remotely to provide the requisite control as desired.

Figure 17:
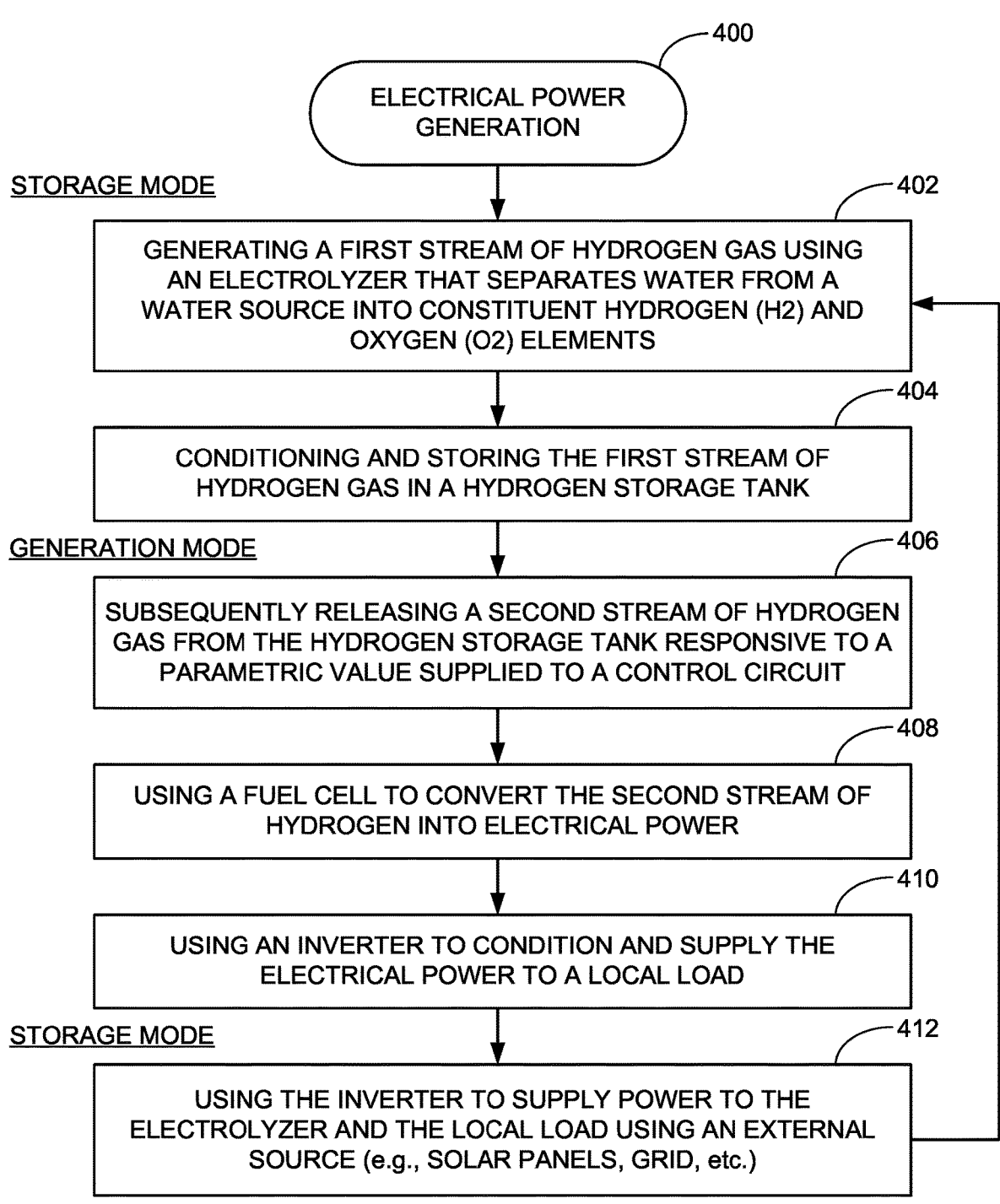
FIG. 17 is a flow chart for a power generation routine illustrative of various steps that can be taken by some embodiments of the present disclosure.

FIG. 17 provides a flow chart for an electrical power generation routine 400 to summarize the foregoing discussion. It will be appreciated that the flow chart is generalized in nature and various alternative and additional steps can be used to modify, augment, append or otherwise the process flow.

As shown at step 402, a first stream of hydrogen gas is generated using an electrolyzer that operates upon water from a water source to separate the water into constituent elements of hydrogen ($H_2$) and oxygen ($O_2$). The first stream of hydrogen gas is conditioned and stored, at step 404, in one or more hydrogen storage tanks. These steps are sometimes herein referred to as a storage mode, and the process can be powered using any number of the alternative configurations discussed above.

At such time that it is desired to transition from the storage mode to a generation mode, a second stream of hydrogen gas is released from the hydrogen storage tank(s), step 406. This transition from the storage mode to the generation mode is carried out by the controller circuit (e.g., controller 336) in response to at least one parametric value (e.g., sensor signal).

As discussed above, this parametric value can include any number of different types of factors, or combination thereof, including but not limited to: detection of a grid failure, detection of the time of day (e.g., evening so no solar will be available for the next several hours), a change in time at which it is more advantageous to commence generation of electrical power, a sensing of a storage level of the tank(s), an indication regarding future opportunities to generate power locally using a renewable source (e.g., a weather report, etc.), an anticipated change in future loading (either reduced or greater load), or any other value generated by or supplied to the system indicative that a change would be advantageous. It will be appreciated that the aforementioned knowledge base can be utilized to select appropriate times to switch over, and that these inputs can be supplied locally or via a remote server as required.

A fuel cell (or multiple fuel cells) is/are utilized at step 408 to convert the second stream of hydrogen gas from the storage tank(s) to electrical power. As discussed above, it is contemplated that this output power will be in the form of direct current (DC) power at a suitable voltage level, such as but not limited to nominally 48 VDC. Other suitable values include, but are not limited to 12 VDC, 24 VDC, 96 VDC, etc. Also, as noted above the output from the fuel cell may instead be in the form of AC power.

An inverter is thereafter used at step 410 to invert and otherwise condition the power to supply such to a local load (e.g., at least one local electrical load associated with a residential or commercial structure, etc.). This may include outputting standard single phase 240 VAC, although other levels and forms can be used, including different frequencies, voltage magnitudes, numbers of phases, etc. Other configurations can be used, however; for example, in some cases it may be desirable to supply DC power from the inverter to the load, etc. The inverter may include transfer switching capabilities to switch among various inputs and outputs.

Finally, because at least some embodiments are configured to alternate between the storage and generation modes, step 412 shows a transition back to the storage mode, in which the inverter is directed to supply power to the electrolyzer (step 402) as well as to the local load using an external power source. As discussed above, a variety of configurations are contemplated such as solar panels, an electrical grid, etc.

The transitioning between the storage mode and the generation mode are carried out by the control circuit (e.g., controller 336, etc.). An actuator (e.g., 346) such as control valve 268 may be activated by the control circuit to redirect the flow of hydrogen gas. Other actuators may include power switches that are activated to engage/disengage powering of the respective electrolyzer and fuel cell, the transition of power paths from various internal and external power sources, etc. The activation takes place based on one or more sensor signals from one or more sensors, as discussed above. Any number of suitable communication protocols can be implemented to allow communication among these various components including, but not limited to, CAN-BUS (controller area network protocol), MOD-BUS, RS232, Ethernet, wireless interconnections, etc.

Figures 18, 19:
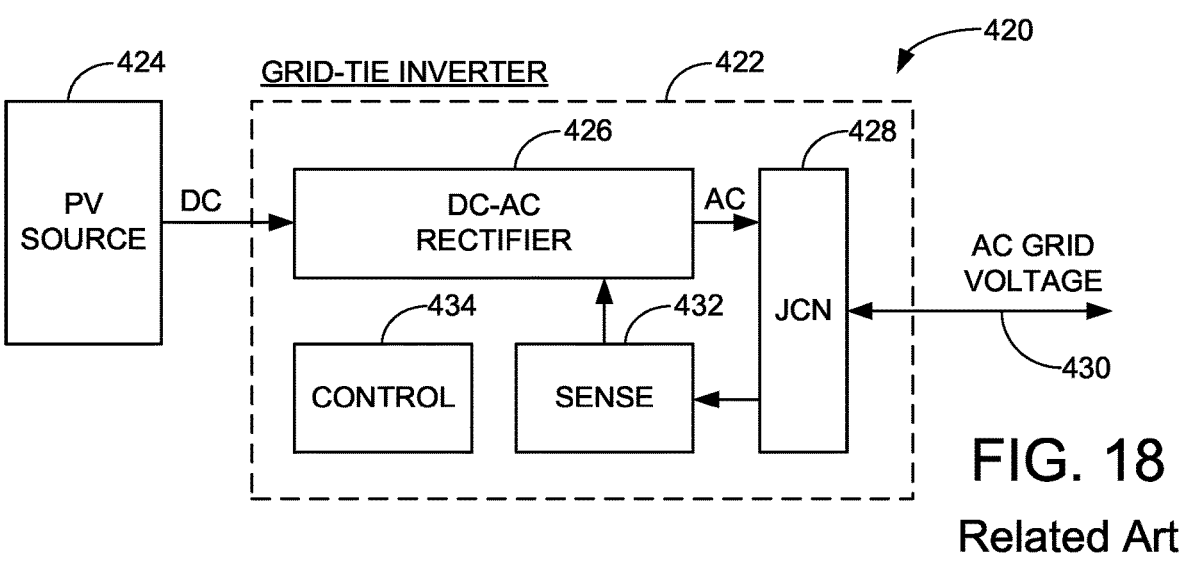
FIG. 18 is a functional block representation of a grid-tie inverter in accordance with the related art.
FIG. 19 shows a functional block representation of another electrical power generation system constructed and operated in accordance with further embodiments, the system in FIG. 19 operative in a normal mode.

FIG. 18 provides a functional block representation of a system 420 having a grid-tie inverter 422 useful in accordance with further embodiments described below. The grid-tie inverter 422 in FIG. 18 is similar in construction and operation to the grid-tie inverters discussed above, including the grid-tie inverter 308 in FIG. 10.

The grid-tie inverter 422 receives input DC power from an input source such as a photovoltaic (PV) source 424. The DC power can be at any suitable voltage, such as but not limited to about 500 VDC.

A DC-AC rectifier 426 of the inverter 422 uses a suitable internal arrangement such as a sequence of H-bridge stages to controllably rectify the input DC power to generate corresponding output AC power at a suitable voltage magnitude, such as but not limited to about 240 VAC. The output AC power is coupled to an output junction (JCN) 428, which in turn is tied to an active line 430 on which additional AC voltage (such as from the utility grid) is present.

A sense circuit 432 monitors the voltage at the junction 430 and, responsive to control inputs supplied by a control circuit 434, adjusts the voltage and phase operation of the rectifier 426 in order to align the phase of the output of the rectifier with the phase of the voltage from the grid line 430.

Normally, some small phase angle differential will be present, such as +/−1% although other differentials can be used. Moreover, normally the voltage from the rectifier may be slightly higher than the voltage on the grid line, such as on the order of around 0.5%-2.0% or so.

In this way, the PV source 424 and the utility grid can cooperate to supply power to the local load in any suitable ratios depending on the load requirements and the output from the PV source. In some cases, the PV source may be able to supply the entirety of the load demands, so that essentially no load current is drawn from the utility source. Depending on the configuration of the system, excess power generated by the PV source may be supplied to the rest of the utility system, providing a credit to the user (e.g., potentially running the electrical meter in reverse, etc.; see FIG. 10).

A grid-tie inverter such as 422 is thus highly useful in situations where electrical utility grid service is available, since the PV source 424 can supply some or all of the needed power to the load when the PV source is available and the electrical grid can supply some or all of the needed power to the load when the PV source is unavailable (e.g., at night, during inclement weather, etc.).

However, a disadvantage of the use of grid-tie inverters such as 422 is that a baseline voltage must normally be present in order for the inverter to operate; that is, an AC voltage should be present on the line 430 in order for the sense circuit 432 to detect and adjust the rectifier 426. As a result, loss of utility grid power, such as a power outage due to a storm, results in loss of the ability to generate local power by the PV source as well. It will be noted that safety standards may also be involved in this operational configuration; it could be potentially dangerous to allow the PV source 424 to continue to electrify the utility lines 430 during outage situations.

Hence, users of PV sources (and other renewable systems) are often faced with a choice of either using a grid-tie inverter configuration as in FIGS. 10 and 18, in which case the PV source is unavailable for use during grid outages, or using a separate, non-grid tied system such as in FIG. 11 which allows use of the PV source during grid outages but does not allow net metering and other benefits of a grid tied system.

FIG. 19 addresses these and other limitations of the existing art by providing a novel electrical power generation system 500 constructed and operated in accordance with further embodiments. The system 500 utilizes a local power and control assembly 502 coupled to a utility grid service as well as a local PV system to provide the best of both worlds, to wit, both grid-tied utility service as well as independent operation of the local PV system during a utility grid outage.

The assembly 502 is shown to include various elements of interest, including a controller 504, a specially configured transfer switch 506, a pass-through (pass-thru) inverter 508, an H2 storage and fuel cell system 510 and batteries 512. For reference, it will be understood that the local power and control assembly 502 operates in accordance with the various embodiments described above regarding the generation, storage and use of hydrogen as well as one or more banks of rechargeable batteries. Since such details have been described in detail above, further discussion of these aspects will be largely omitted.

A grid terminal 514 serves as a connection point to an upstream utility service (not separately shown). The upstream utility service will be understood as described above as providing AC power at selected voltage. Additional equipment such as disconnect switches, utility service, metering, etc. can be included as required but have been omitted for simplicity of illustration.

A grid-tie inverter 516 is configured similarly to the grid-tie inverter 422 shown in FIG. 18 above, and operates to convert input DC power (in this case, nominally 500 VDC) from a PV source 518 to output AC power (in this case, nominally 240 VAC). As before, additional elements such as disconnect switches, panels, etc. can be included as required but have been omitted for clarity.

The system is thus configured to supply continuous power (such as normally 240 VAC) to a house load 520 from either and/or both the utility service and the PV source.

Of particular interest is the transfer switch 506, which is shown to include an input junction 522, a first output junction 524, a second output junction 526, a sense input junction 528, a solenoid (SOL) assembly 529, and a switching (connection) mechanism 530. The switching mechanism 530 respectively interconnects the input junction 522 to each of the respective first and second output junctions 524, 526. The transfer switch 506 can be characterized as a normally closed (NC) transfer switch in that, in the presence of a sensed input at the sense junction the input junction 522 is connected to the first output junction 524 as configured in FIG. 19. The solenoid assembly 529 incorporates a solenoid and spring arrangement to respond to the sense junction to controllably position the connection mechanism 530. Other actuator configurations can be used as desired.

It can be seen that the output voltage from the grid-tie inverter 516 (hereafter sometimes referred to as the "PV voltage" or similar) is supplied to the input junction 522, and the output voltage from the grid terminal 514 (hereinafter sometimes referred to as the "grid voltage" or similar) is supplied to both the first output junction 524 and the sense input junction 528. It will be noted that the labeling of the various junctions 522, 524 and 526 as respective input and output junctions are functional descriptions based on the novel configuration of FIG. 19, and may not necessarily correspond to the labeling or manner in which a transfer switch such as 506 is normally utilized. This will be explained in greater detail below.

In the configuration of FIG. 19, which is referred to as a normal mode, both utility grid power and PV source power are available and supplied to the system. The grid-tie inverter 516 is electrically coupled to and senses the grid voltage from the grid terminal 514, allowing normal operation as described above in FIG. 18.

Figures 20, 21:
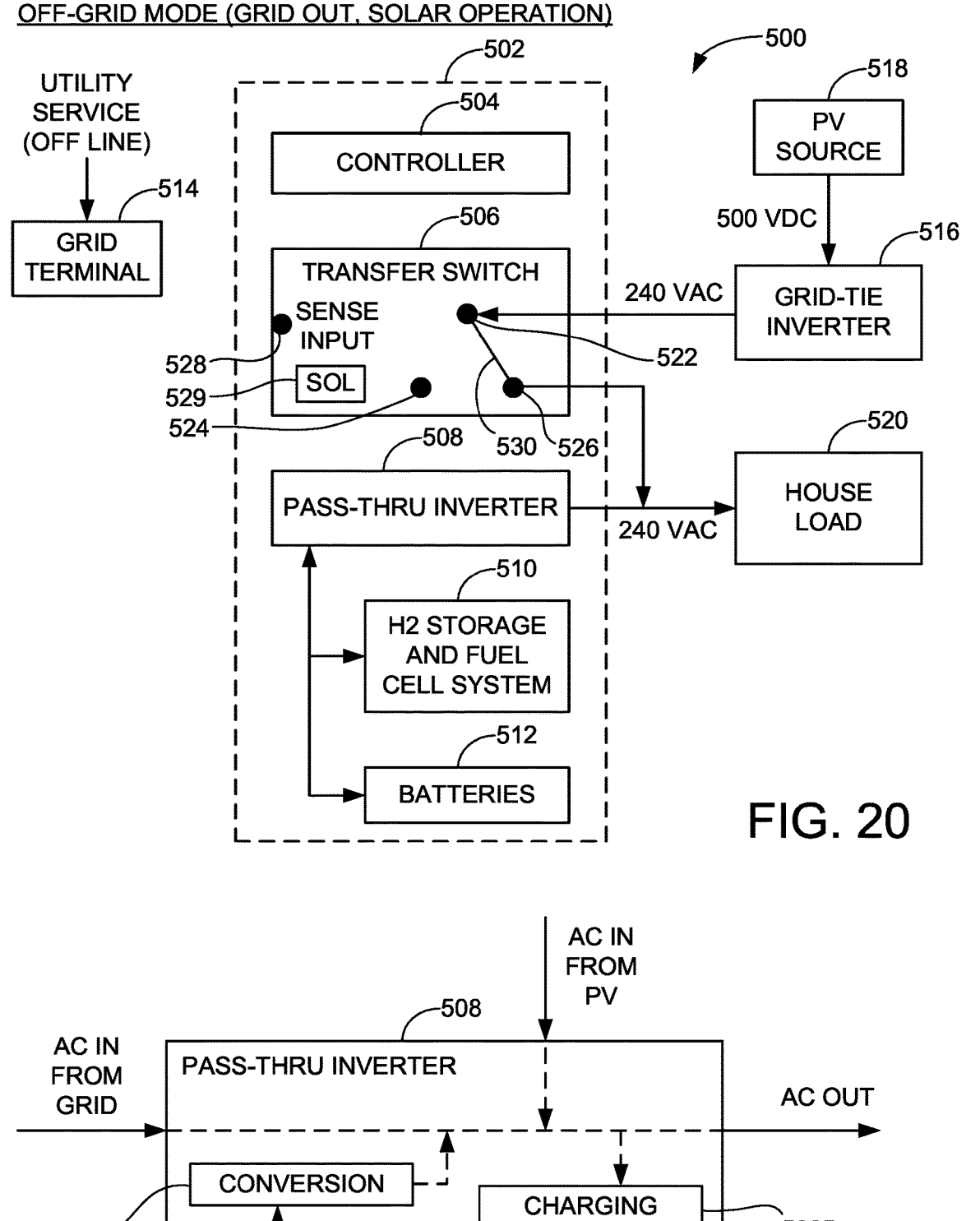
FIG. 20 shows the system of FIG. 19 operative in an off-grid mode.
FIG. 21 is a functional block representation of a pass-through (pass-thru) inverter of the system of FIGS. 19-20 in some embodiments.

FIG. 20 shows the system 500 of FIG. 19 in an off-grid mode, which corresponds to a situation where an outage condition has been experienced for the utility service. This may arise based on a number of conditions, such as storm damage, a planned service outage, etc. Regardless of cause, the off-grid mode results in a loss of grid voltage from the grid terminal 514 at both the sense input junction 528 and the first output junction 524.

As a result, the transfer switch 506 operates to automatically switch the connection mechanism 530 to interconnect the input junction 522 with the second output junction 526. It will be noted that the controller 504, which may take the various forms described above including one or more programmable processors, associated firmware/software, sensors, etc. may be configured to sense the outage condition and initiate the generation of AC power from one or more of the backup systems (e.g., the H2 system 510 and/or the battery backup system 512). As desired, the controller 504 can also provide control inputs to the transfer switch 506 in some embodiments.

The sensed output voltage from the backup system(s), referred to herein as backup voltage, is output by the inverter 508 in a manner similar to that described above to continue servicing of the house load 520. In this case, however, because the grid-tie inverter 516 is now connected to the output of the inverter 508, the grid-tie inverter 516 again establishes appropriate voltage and phase characteristics of the PV voltage to match that of the backup voltage.

This allows the PV source 518 to continue to supply some or all of the house load requirements, relying on the backup power to supply the necessary baseline voltage. As required, should excess power be generated by the PV source over and above that required by the house load, the excess power can be utilized to generate additional H2 for storage and/or recharge the batteries.

Depending on the configuration of a given system, it may not be possible to operate the H2 system 510 in both an H2 storage mode and an H2 power generation mode at the same time (see e.g., FIG. 17 above). In such case, the controller 504 can be configured to direct the batteries 512 to supply sufficient baseline voltage to the inverter for sensing and matching by the grid-tie inverter 516, allowing the hydrogen storage cycle to be implemented using the excess power. The system can switch between various charging and power generation modes as determined by the controller.

FIG. 21 is a simplified functional block representation of aspects of the pass-thru inverter 508 of FIGS. 19-20 in accordance with some embodiments. Various internal circuits such as sensors, regulators, boosters, switches, etc. have been omitted for clarity. In general, the AC power in from the grid is combined (either externally or internally as required) with the AC power in from the PV source (via the grid-tie inverter).

Conversion circuitry 508A, such as in the form of a DC-AC transformer, etc., is used to condition and/or convert the input backup power from the backup sources of power (e.g., the hydrogen fuel cells used to convert stored hydrogen to electricity, the backup battery packs, etc.).

Charging circuitry 508B, such as in the form of an AC-DC rectifier, etc., generates appropriate voltage to operate the recharging mechanisms for the backup sources of power, such as the electrolyzers used to generate and store hydrogen, battery charging circuits, etc. It will be noted that both the conversion and charging circuits 508A, 508B in the configuration of FIG. 21 can normally be operational as desired both during normal and off-grid modes, provided that sufficient backup power is supplied by the conversion circuitry 508A during off-grid modes to maintain operation of the grid-tie inverter 516.

While H2 and battery backup systems have been illustrated for purposes of providing a specific embodiment, it will be appreciated that substantially any source can be used provided the backup AC power is sufficient to enable continued operation of the grid-tie inverter during off-grid mode. Thus, other examples include but are not limited to gasoline, diesel and/or natural gas powered electric generators, wind turbine systems, a second set of PV panels, etc.

Figures 22, 23:
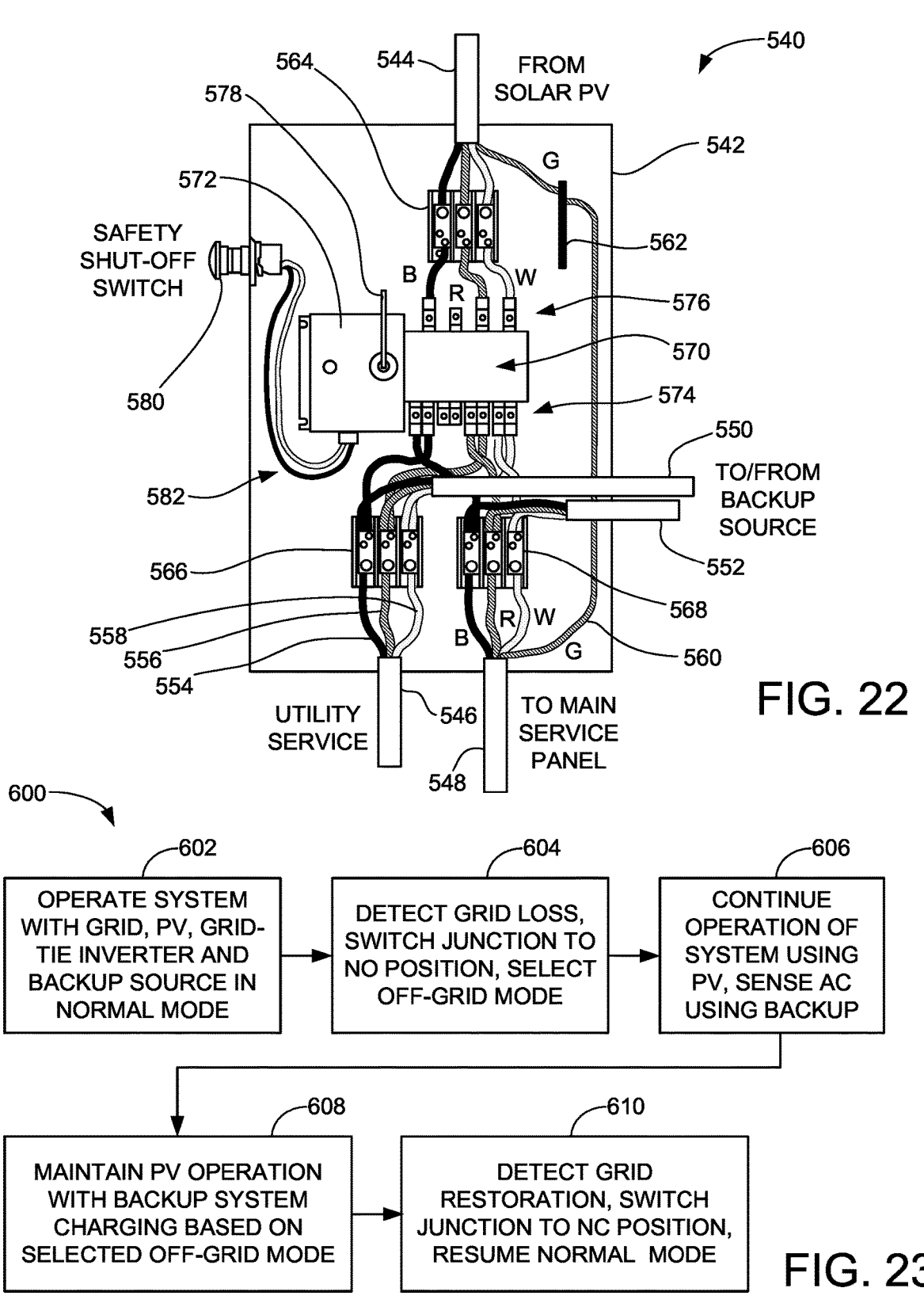
FIG. 22 is a functional block representation of a transfer switch assembly of the system of FIGS. 19-20 in some embodiments.
FIG. 23 is a sequence diagram to illustrate operation of the system of FIGS. 19-20 under different operational mode conditions in some embodiments.

FIG. 22 shows aspects of a transfer switch assembly 540 in accordance with further embodiments. The transfer switch assembly 540 generally corresponds to the transfer switch 506 described above, although other configurations can be used. The assembly 540 includes a junction box (case) 542 which houses various elements of interest. The junction box 542 may be configured as a rectangular steel box with a front cover door (not separately shown), allowing the box to be weatherproofed, locked, etc. as required.

Multi-conductor conduits are respectively shown at 544 from the solar photovoltaic (PV) system, 546 from the utility service, 548 to the main service panel in the residential load, and 550, 552 to and from the backup source, respectively. These generally correspond to the various inputs and outputs to the transfer switch 506 described above in FIGS. 19-20.

Each of the respective conduits 544-552 have an outer insulative and weather protective sheath (not separately numerically denoted) which encapsulates interior insulated power conductors (wires) including black (B) 554, red (R) 556, white (W) 558 and, as needed, green 560 (G). The black and red wires 554, 556 are single phase power conductors, the white wires 558 are neutral conductors, and the green wires 560 are ground conductors.

The power and neutral conductors 554, 556, 558 are respectively interconnected to three (3) terminal blocks 564, 566 and 568 as shown. The terminal blocks 564, 566, 568 generally correspond to the nodes 522, 524 and 526 in FIGS. 19-20. The ground wires are interconnected to a ground terminal 568.

An automatic changeover transfer switch mechanism is denoted at 570. Mechanisms such as 570 are commercially available from any number of suitable sources and can be adapted to perform the various switching operations as described above. In this example, the power sensing, connection mechanism, solenoid assembly, etc. described above in FIGS. 19-20 are incorporated into a main body 572 of the transfer switch mechanism 570.

Those having skill in the art will recognize that automatic changeover transfer switch mechanisms such as 570 are usually provisioned with multiple sets of input terminals and a single set of load output terminals. Each power source, such as a primary source and a secondary source, are connected to a different respective set of the input terminals, and the load is connected to the load output terminals. In this way, the mechanism senses the presence of input power and automatically switches to the source providing power, such as from the primary source to the secondary source in the absence of power from the primary source.

In FIG. 22, a novel and non-intuitive interconnection is provided. Power input terminals 574 of the automatic changeover transfer switch mechanism 570 interconnect the utility, backup source and load via the terminal blocks 566 and 568 as shown. Load terminals 576 of the automatic changeover transfer switch mechanism 570 receive inputs from the PV source via the terminal block 564. In this way, the system switches among the various use cases described above in FIGS. 19-20, including net metering grid-tied operation in the presence of utility grid power, and off-grid isolation and PV source operation with the backup source during grid outage conditions. Other wiring configurations can be utilized as desired, so the arrangement of FIG. 22 is merely exemplary and is not limiting.

As further shown in FIG. 22, the automatic changeover transfer switch mechanism 570 can be configured to include a manual switch lever 578 to enable a user to manually transition between different connection positions. A user activated, emergency shut-off switch 580 and corresponding conductors 582 enable the user to manually disconnect all terminal connections in the event of an emergency by pressing the switch.

The off-grid mode as described above can take one of several operational profiles in accordance with further embodiments. In one case, once off-grid mode is entered, the system continues to operate so long as backup power continues to be available; that is, the backup sources of power (e.g., hydrogen, batteries, generator, etc.) continue to be used (including full-time), and so long as backup power is still present, the PV source generates and inputs power to the house loads (as the PV source is available such as during periods of adequate sunlight).

In another related case, the controller monitors the house load and provides the user with information regarding the continued availability of backup power from one or more of the backup sources, such as the amount of remaining charge in the batteries, the amount of remaining hydrogen, etc. It is noted that during periods of full PV power generation the draw on the hydrogen and battery reserves may be relatively low, since all that is substantially required is to supply sufficient baseline voltage to enable the grid-tie inverter to operate. As such, some power will be required but the system can operate to minimize this and maximize the power from the PV source.

By careful monitoring and system selection via the user inputs described herein (including via tablet, smart phone, etc.), the knowledge data base can enable the user to run the system indefinitely in an off-grid condition. For example, should a storm or other event cause an extended grid outage condition, the controller can operate to meter and direct the energy generation from the PV source so that sufficient reserve power is stored to allow continued operation, albeit with the possible likelihood of reduced power availability or reduced maximum loading levels.

The knowledge databases and routines executed by the system can use accumulated history data to estimate and configure the system as described above. For example, at the beginning of a particular power outage the user can indicate the type or source of outage (e.g., storm, planned outage by the utility company, etc.), or such system can be obtained from a remote source. Similar data can be supplied (weather forecasts, etc.) as part of the estimated loading calculations based on the expected length of the outage. Other information can be utilized by the controller as well, such as amount of reserve H2 stored by the system (e.g., the system is charged to 80% of maximum, etc.), the charge levels of the batteries, the amounts of available fuel for external powered generators, and so on. Based on these and other factors, the system can operate as described above to manage the off-grid mode operation, including selecting appropriate storage and generation modes, etc.

FIG. 23 accordingly shows a sequence diagram 600 to illustrate various modes of operation of the embodiments described above in FIGS. 18-22. The various operations set forth in FIG. 23 are merely illustrative and other steps or operations can be utilized as desired.

Block 602 shows normal operation of the system as in FIG. 19, so that a utility grid, PV source, grid-tie inverter, and one or more backup sources are interconnected through a suitable transfer switch to enable grid-tied operation.

Block 604 indicates a loss of grid power, resulting in a transition to the off-grid mode of operation of FIG. 20. This is initiated as described above by the switching of the transfer switch and the initiation of backup baseline voltage to enable the grid-tie inverter to continue operation, as indicated by block 606.

Block 608 shows continued maintenance of the system in the off-grid mode, including, as desired, controller operation (including via knowledge base and/or user inputs) to establish appropriate backup reserve power management levels. As noted above, in one scenario the system is simply allowed to continue to operate until all backup systems are depleted, at which time all power is lost (assuming the outage continues). In another scenario, backup power reserves are monitored and PV source voltage is diverted to maintain adequate levels of stored hydrogen/battery reserves to enable continued operation above a certain minimum level.

Finally, as indicated by block 610, grid power is ultimately restored, enabling the transfer switch to be transitioned back to the normal position, resuming normal mode operation as before.

In this way, the embodiments of FIGS. 18-23 provide an electrical power generation system in a modified grid-tie configuration in which electrical power is supplied to a load from a utility grid source and a photovoltaic (PV) source such as an arrangement of solar panels. A grid-tie inverter is used to convert output direct current (DC) power from the PV source to alternating current (AC) power. The grid-tie inverter includes sense circuitry to sense and establish appropriate voltage and phase characteristics so that the AC power from the PV source is aligned with the AC power from the utility grid source. A specially configured transfer switch arrangement is utilized to enable the PV source to continue to supply power to the local load even in the event of a loss of utility power based on the supplying of baseline voltage from one or more backup sources. While a PV source has been described, other forms of secondary power generation as described above can be used to interconnect the grid-tie inverter including, but not limited to, a wind turbine, etc.

It will now be appreciated that the various embodiments presented herein provide sustainable energy solutions with a number of benefits over the existing art. The use of hydrogen storage is cleaner, more efficient and safer, both for the user and the environment. The system is modular so that, as required, additional tanks, hydrolyzers, and/or fuel cells can be integrated into the system seamlessly to provide additional power generating capabilities. The system can be coupled to an existing power-grid from a power company, to a local source of renewable energy (e.g., solar, wind, hydro), to an existing bank of storage batteries, etc. The system can further be largely made up of existing, commercially available components (including but not limited to an otherwise conventional PV grid-tie inverter).

While not necessarily limiting, the system can be configured to be fully self-sustaining, requiring true local, off-the-grid efficient power generation, either on a short term or on a long term basis. The system can be sized and configured to accommodate any number of different applications. Environmentally extreme and isolated conditions (e.g., Arctic or tropical locations, desert conditions, oceangoing or ocean based vessels and platforms, etc.) can be readily accommodated. Water for the system can be provided from any suitable source including but not limited to a domestic supply (e.g., a municipal water company), a well, a storage tank, a rain water collection system, a water vapor extractor, a desalination mechanism, etc. Power generated by the system can be used to run these and other support systems. In many cases, provided there is sufficient hydrogen and stored power in the batteries to initiate the fuel cell(s), energy can be generated for use by the system even in the absence of any other local source of power.

Any number of different design configurations are contemplated by the present disclosure. These include, but are not limited to, the following:

1. A completely green energy system that is self-sustaining and not connected to an existing energy grid, and which generates substantially zero carbon emissions. This can include systems where the only source of power is through the fuel cell, or systems that have secondary powered backup systems such as through the use of an emergency backup generator, batteries, etc.

2. A grey/green system where a tie-in is provided to an existing energy grid, but the primary energy of the local load is supplied by the system and the energy grid is only used in exceptional conditions to power the input of the hydrogen generation cycle.

3. A grey/green system where the system is utilized as a peak usage system to supply power either at times of peak power cost (e.g., in the afternoons) or as a power back-up system so that power can be supplied automatically should a power disruption event take place.

4. A system where the output of the electrolyzer operates to generate compressed hydrogen gas, for the use by automobiles or other loads such as fork lifts, hospitals, airships, refineries, furnaces, etc.

5. Any combination of the above where the system provides compressed hydrogen for an automobile (or other load) while also supplying a portion of the hydrogen to generate electricity for local loads.

6. Any combination of the above, wherein the system further is configured to supply pressurized hydrogen for various utilities, such as but not included to an HVAC furnace, a water heater, a cooktop stove, etc. in a "smart home" environment.

7. Any combination of the above, wherein the system is further configured in a modified grid-tie configuration to enable normal grid-tie operation of both a utility grid and a secondary source (such as but not limited to a PV source) with a specially configured transfer switch to allow continued secondary source generation even in the event of a utility grid outage.

Other configurations will readily occur to the skilled artisan in view of the present disclosure.

In sum, a control system operates, including in cooperation with a knowledge base, to combine individual components and control them autonomously. The design is modular and simple to install. Monitoring is performed via system and reporting of functional issues, needed repairs or system efficiencies will be carried out to require the least amount of human interface during operation. In some cases, voice activated smart home systems may be accessed by the user to inquire how much equivalent power is stored, how long can the system operate on backup power, etc.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An electrical power generation system comprising:

a transfer switch having an input junction, a first output junction, a second output junction, a sense junction and a switching mechanism that respectively interconnects the input node to the first output junction responsive to the presence of a sensed input at the sense junction and interconnects the input node to the second output junction responsive to an absence of the sensed input at the sense junction;

a grid terminal respectively coupled to each of the sense junction and the first output junction, the grid terminal coupled to an upstream utility service source of grid alternating current (AC) power;

a grid-tie inverter coupled to the input node and configured to generate photovoltaic (PV) AC power from direct current (DC) power generated by an upstream PV source;

a pass-through inverter coupled to each of the first and second output junctions of the transfer switch and having an output junction configured to supply output AC power to a load;

a backup source of backup AC power coupled to the pass-through inverter; and a control circuit configured to operate the transfer switch in a normal mode in which the grid AC power from the grid terminal is supplied to both the sense junction and the first output junction to interconnect, via the switching mechanism of the transfer switch, with the PV AC power from the grid-tie inverter to supply the output AC power to the load, the control circuit further configured to transition the transfer switch from the normal mode to an off-grid mode responsive to a loss of the grid AC power from the grid terminal, wherein during the off-grid mode the backup AC power is interconnected, via the switching mechanism, with the PV AC power from the grid-tie inverter to supply the output AC power to the load.

2. The electrical power generation system of claim 1, wherein the grid-tie inverter comprises a sense circuit that senses a baseline voltage at an output junction and a DC-AC rectifier that generates the PV AC power having voltage and phase characteristics adjusted, responsive to the sense circuit, to nominally match the baseline voltage at the output junction.

3. The electrical power generation system of claim 1, wherein the transfer junction uses an electro-mechanical element to maintain the switching mechanism in a normally closed (NC) position to interconnect the input junction and the first output junction responsive to an input at the sense junction, the electro-mechanical element releasing the switching mechanism to transition to a normally open (NO) position to interconnect the input junction and the second output junction responsive to a loss of the input at the sense junction.

4. The electrical power generation system of claim 3, wherein the electro-mechanical element comprises a solenoid.

5. The electrical power generation system of claim 1, wherein the backup source comprises at least a selected one of a hydrogen fuel cell, a gasoline powered electrical generator, a diesel powered electrical generator, a natural gas powered electrical generator, or an electrical battery.

6. The electrical power generation system of claim 1, wherein the pass-through inverter comprises a conversion circuit that converts DC power from the backup source to generate the backup AC power and interconnects the backup AC power to the PV AC power from the grid-tie inverter.

7. The electrical power generation system of claim 6, wherein the pass-through inverter further comprises a charging circuit that converts a portion of the PV AC power to charging DC power used to charge the backup source.

8. The electrical power generation system of claim 1, wherein during the normal mode the PV source generates excess power over what is utilized by the load and the excess power is flowed, via the grid-tie inverter, through an electrical meter associated with the utility grid to generate a credit for a user of the system.

9. The electrical power generation system of claim 1, wherein during the off-grid mode the PV source generates excess power over what is utilized by the load and the excess power is flowed, via the grid-tie inverter, through a charging circuit to charge an energy store of the backup source.

10. The electrical power generation system of claim 1, wherein the controller is further configured to continue operation in the off-grid mode until such time that an available energy store of the backup source is depleted, thereby preventing further operation of the grid-tie inverter responsive to a lack of a baseline voltage at an output junction of the grid-tie inverter.

11. The electrical power generation system of claim 1, wherein the controller is further configured to identify a minimum amount of available energy store for the backup source to maintain continued operation of the grid-tie inverter in the off-grid mode for at least a minimum selected time period, and wherein the controller directs the PV AC power to be diverted from the load to a charging circuit to maintain the minimum amount of available energy store for the backup source.

12. The electrical power generation system of claim 1, wherein the backup source comprises a source of water, an electrolyzer configured to generate hydrogen from the water, a storage tank configured to accumulate the hydrogen, and a hydrogen fuel cell which generates electricity from the hydrogen stored in the storage tank.

13. The electrical power generation system of claim 1, wherein the PV AC power, the grid AC power and the backup AC power are each at nominally 240 VAC.

14. The electrical power generation system of claim 1, wherein the load is a residential load comprising a plurality of electrical devices operated within a human residence.

15. A method for generating electrical power, comprising:

connecting a grid terminal of a utility service to a grid-tie inverter of a photovoltaic (PV) source through a transfer switch;

using the grid terminal and the grid-tie inverter to supply first output power to a load, via a pass-through inverter coupled to the transfer switch, during a grid-tied mode of operation, the grid terminal providing grid alternating current (AC) power from the utility service to a first output junction of the transfer switch and to a sense junction of the transfer switch, the grid-tie inverter providing PV AC power from the PV source to an input junction of the transfer switch, the grid AC power at the sense junction placing a switching mechanism of the transfer switch in a normally closed (NC) position to interconnect the input junction to the first output junction so that a combination of the grid AC power and the PV AC power flows from the first output junction to the pass-through inverter to generate the first output power supplied to the load; and subsequently using the grid-tie inverter and a backup source to supply second output power to the load, via the pass-through inverter and the transfer switch, during an off-grid mode of operation in which a loss of grid AC power at the sense junction is experienced, the loss of grid power causing the switching mechanism of the transfer switch to transition to a normally open (NO) position to interconnect the input junction to a different, second output junction so that a combination of the PV AC power and backup AC power from the backup source flows to the load;

wherein during the grid-tied mode of operation the grid-tie inverter phase matches the PV AC power with the grid AC power, and during the off-grid mode of operation the grid-tie inverter phase matches the PV AC power with the backup AC power.

16. The method of claim 15, wherein the grid-tie inverter comprises a sense circuit that senses a baseline voltage at an output junction and a DC-AC rectifier that generates the PV AC power having voltage and phase characteristics adjusted, responsive to the sense circuit, to nominally match the baseline voltage at the output junction.

17. The method of claim 15, wherein the transfer junction uses an electro-mechanical element to maintain the switching mechanism in a normally closed (NC) position to interconnect the input junction and the first output junction responsive to an input at the sense junction, the electro-mechanical element releasing the switching mechanism to transition to a normally open (NO) position to interconnect the input junction and the second output junction responsive to a loss of the input at the sense junction.

18. The method of claim 15, wherein the backup source comprises at least a selected one of a hydrogen fuel cell, a gasoline powered electrical generator, a diesel powered electrical generator, a natural gas powered electrical generator, or an electrical battery.

19. The method of claim 15, wherein the pass-through inverter comprises a conversion circuit that converts DC power from the backup source to generate the backup AC power and interconnects the backup AC power to the PV AC power from the grid-tie inverter, and a charging circuit that converts a portion of the PV AC power to charging DC power used to charge the backup source.

20. The method of claim 15, further comprising using a controller having at least one programmable processor to identify a minimum amount of available energy store for the backup source to maintain continued operation of the grid-tie inverter in the off-grid mode for at least a minimum selected time period, and wherein the controller directs the PV AC power to be diverted from the load to a charging circuit to maintain the minimum amount of available energy store for the backup source.

* * * * *